United States Patent
Rahman

(10) Patent No.: US 11,193,370 B1
(45) Date of Patent: Dec. 7, 2021

(54) SYSTEMS AND METHODS FOR TRANSIENT TESTING OF HYDROCARBON WELLS

(71) Applicant: SAUDI ARABIAN OIL COMPANY, Dhahran (SA)

(72) Inventor: Noor Anisur Rahman, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/894,730

(22) Filed: Jun. 5, 2020

(51) Int. Cl.
*G06F 17/11* (2006.01)
*G05B 13/02* (2006.01)
*E21B 47/06* (2012.01)
*E21B 49/00* (2006.01)

(52) U.S. Cl.
CPC ............ *E21B 49/005* (2013.01); *E21B 47/06* (2013.01); *G05B 13/024* (2013.01); *G06F 17/11* (2013.01)

(58) Field of Classification Search
CPC ..... E21B 49/005; E21B 47/06; G05B 13/024; G06F 17/11
See application file for complete search history.

(56) References Cited

U.S. PATENT DOCUMENTS

| | | |
|---|---|---|
| 3,079,085 A | 2/1963 | Clark et al. |
| 3,246,145 A | 4/1966 | Higgins |
| 3,784,828 A | 1/1974 | Hayes |
| 3,892,128 A | 7/1975 | Smith, Jr. |
| 3,905,226 A | 9/1975 | Nicolas |
| 4,028,546 A | 6/1977 | Peelman et al. |

(Continued)

FOREIGN PATENT DOCUMENTS

| | | |
|---|---|---|
| CN | 102953726 A | 3/2013 |
| CN | 104504230 A | 4/2015 |

(Continued)

OTHER PUBLICATIONS

Cinco-Ley, et al., "Use and Misuse of the Superposition Time Function in Well Test Analysis", 64th Annual Technical Conference and Exhibition of the Society of Petroleum Engineers held in San Antonio, TX, Oct. 8-11, 1989 (Year: 1989).*

(Continued)

*Primary Examiner* — Regis J Betsch
(74) *Attorney, Agent, or Firm* — Bracewell LLP; Constance G. Rhebergen; Christopher L. Drymalla

(57) ABSTRACT

Techniques for developing a hydrocarbon reservoir that include: obtaining, by way of a downhole pressure sensor of a hydrocarbon well, pressure transient test data that reflects prior changes in the flow rates corresponding to measurements of bottomhole pressure across a given interval of time during pressure transient testing of the well, conducting, for the pressure data points, a time function superposition that includes application of a superposition time function to generate superposition times for the measurements of pressure across the interval, determining, based on the superposition times and corresponding measurements of pressure, first order derivative (FOD) values for the measurements of pressure across the interval, determining, based on the FOD values for the measurements of pressure, second order derivative (SOD) values for the measurements of pressure across the interval, and generating a log plot of the SOD values for the measurements of pressure across the interval of time.

28 Claims, 11 Drawing Sheets

(56) References Cited

U.S. PATENT DOCUMENTS

| | | | |
|---|---|---|---|
| 4,173,718 A | 11/1979 | Fertl | |
| 4,215,567 A | 8/1980 | Vlcek | |
| 4,353,122 A | 10/1982 | Cubberly, Jr. | |
| 4,475,591 A | 10/1984 | Cooke, Jr. | |
| 4,799,157 A | 1/1989 | Kucuk et al. | |
| 4,803,873 A | 2/1989 | Ehlig-Economides | |
| 4,969,130 A | 11/1990 | Wason et al. | |
| 5,031,467 A | 7/1991 | Rambow | |
| 5,305,209 A | 4/1994 | Stein et al. | |
| 5,431,227 A | 7/1995 | Montgomery et al. | |
| 5,509,474 A | 4/1996 | Cooke, Jr. | |
| 5,548,563 A | 8/1996 | Slevinsky | |
| 5,586,082 A | 12/1996 | Anderson et al. | |
| 5,730,219 A | 3/1998 | Tubel et al. | |
| 5,787,050 A | 7/1998 | Slevinsky | |
| 5,803,167 A | 9/1998 | Bussear et al. | |
| 5,829,520 A | 11/1998 | Johnson | |
| 5,934,371 A | 8/1999 | Bussear et al. | |
| 5,959,203 A | 9/1999 | Ajjoul | |
| 5,975,204 A | 11/1999 | Tubel et al. | |
| 6,101,447 A | 8/2000 | Poe | |
| 6,840,317 B2 | 1/2005 | Hirsch et al. | |
| 6,842,700 B2 | 1/2005 | Poe | |
| 6,898,986 B2 | 5/2005 | Daniel et al. | |
| 6,980,940 B1 | 12/2005 | Gurpinar et al. | |
| 7,062,420 B2 | 6/2006 | Poe | |
| 7,089,167 B2 | 8/2006 | Poe | |
| 7,107,188 B2 | 9/2006 | Veneruso et al. | |
| 7,240,568 B2 | 7/2007 | Atkinson | |
| 7,293,471 B2 | 11/2007 | Lund Bo et al. | |
| 7,369,979 B1 | 5/2008 | Spivey | |
| 7,389,185 B2 | 6/2008 | Craig | |
| 7,580,796 B2 | 8/2009 | Soliman et al. | |
| 7,580,797 B2 | 8/2009 | Akram et al. | |
| 7,708,086 B2 | 5/2010 | Witte | |
| 7,774,140 B2 | 8/2010 | Craig | |
| 7,899,657 B2 | 3/2011 | Imartin | |
| 8,032,345 B2 | 10/2011 | Le Ravalec et al. | |
| 8,065,923 B2 | 11/2011 | Duhanyan et al. | |
| 8,087,292 B2 | 1/2012 | Voelker | |
| 8,116,980 B2 | 2/2012 | Beretta et al. | |
| 8,244,509 B2 | 8/2012 | Banerjee et al. | |
| 8,275,593 B2 | 9/2012 | Zhao | |
| 8,437,962 B2 | 5/2013 | Craig | |
| 8,437,997 B2 | 5/2013 | Meurer et al. | |
| 8,473,268 B2 | 6/2013 | Benish et al. | |
| 8,589,135 B2 | 11/2013 | Middya et al. | |
| 8,620,611 B2 | 12/2013 | Ong | |
| 8,620,636 B2 | 12/2013 | Zhan et al. | |
| 8,781,747 B2 | 7/2014 | Ziauddin | |
| 8,793,110 B2 | 7/2014 | Myers et al. | |
| 8,793,112 B2 | 7/2014 | Levitan | |
| 8,849,637 B2 | 9/2014 | Chavez et al. | |
| 8,898,017 B2 | 11/2014 | Kragas et al. | |
| 9,068,872 B2 | 6/2015 | Gysling | |
| 9,085,966 B2 | 7/2015 | Rahman | |
| 9,151,868 B2 | 10/2015 | Levitan | |
| 9,194,968 B2 | 11/2015 | Imhof et al. | |
| 9,261,869 B2 | 2/2016 | Cheng et al. | |
| 9,367,653 B2 | 6/2016 | Madasu et al. | |
| 9,417,970 B2 | 8/2016 | Fulton et al. | |
| 9,488,752 B2 | 11/2016 | Rahman et al. | |
| 9,513,241 B2 | 12/2016 | Whittaker | |
| 9,569,521 B2 | 2/2017 | Crafton | |
| 9,617,833 B2 | 4/2017 | Madasu et al. | |
| 9,626,466 B2 | 4/2017 | Yang et al. | |
| 10,180,057 B2 | 1/2019 | Rahman et al. | |
| 2002/0043370 A1 | 4/2002 | Poe | |
| 2002/0189337 A1 | 12/2002 | Maute | |
| 2003/0225522 A1 | 12/2003 | Poe | |
| 2005/0222852 A1 | 10/2005 | Craig | |
| 2008/0210470 A1 | 9/2008 | Stewart | |
| 2009/0114010 A1 | 5/2009 | Beretta et al. | |
| 2009/0126475 A1 | 5/2009 | Zhang et al. | |
| 2009/0276156 A1 | 11/2009 | Kragas et al. | |
| 2009/0308601 A1 | 12/2009 | Poe, Jr. et al. | |
| 2010/0023269 A1 | 1/2010 | Yusti et al. | |
| 2010/0082258 A1 | 4/2010 | Wang | |
| 2010/0224361 A1 | 9/2010 | Pope et al. | |
| 2010/0286918 A1 | 11/2010 | Moos et al. | |
| 2010/0307743 A1 | 12/2010 | Ziuddin | |
| 2011/0015909 A1 | 1/2011 | Zhao | |
| 2011/0040536 A1 | 2/2011 | Levitan | |
| 2011/0087471 A1 | 4/2011 | Postl et al. | |
| 2011/0191029 A1 | 8/2011 | Jalali et al. | |
| 2011/0266056 A1 | 11/2011 | Pop et al. | |
| 2012/0018167 A1 | 1/2012 | Konopczynski et al. | |
| 2012/0092690 A1 | 4/2012 | Gaston et al. | |
| 2012/0303281 A1* | 11/2012 | Hon | E21B 47/06 702/12 |
| 2013/0080128 A1 | 3/2013 | Yang | |
| 2013/0186688 A1 | 7/2013 | Rasmus et al. | |
| 2013/0205886 A1 | 8/2013 | Hegeman et al. | |
| 2013/0231867 A1 | 9/2013 | Lin et al. | |
| 2013/0245952 A1 | 9/2013 | Lin et al. | |
| 2013/0255940 A1 | 10/2013 | Rochford et al. | |
| 2014/0083687 A1 | 3/2014 | Poe et al. | |
| 2014/0136158 A1 | 5/2014 | Hegazy et al. | |
| 2014/0190695 A1 | 7/2014 | Van Zanten et al. | |
| 2014/0257775 A1 | 9/2014 | Levitan | |
| 2015/0039234 A1 | 2/2015 | Abou-Sayed et al. | |
| 2015/0039275 A1 | 2/2015 | Mikhailov et al. | |
| 2015/0075787 A1 | 3/2015 | Davidson et al. | |
| 2015/0233233 A1 | 8/2015 | Rahman | |
| 2015/0253453 A1 | 9/2015 | Aldridge et al. | |
| 2015/0276970 A1 | 10/2015 | Wu et al. | |
| 2016/0003026 A1 | 1/2016 | Adams et al. | |
| 2016/0061020 A1 | 3/2016 | Sayarpour | |
| 2016/0177679 A1 | 6/2016 | Zhang et al. | |
| 2016/0178799 A1 | 6/2016 | Sayarpour et al. | |
| 2016/0201452 A1 | 7/2016 | Anisur et al. | |
| 2016/0208599 A1 | 7/2016 | Rahman et al. | |
| 2020/0173261 A1* | 6/2020 | El Kholy | E21B 41/00 |

FOREIGN PATENT DOCUMENTS

| | | |
|---|---|---|
| CN | 106096300 A | 11/2016 |
| EP | 0286152 A1 | 10/1988 |
| WO | 9517581 A1 | 6/1995 |
| WO | 2007134747 | 11/2007 |
| WO | 2011019565 A2 | 2/2011 |
| WO | 2011025471 A1 | 3/2011 |
| WO | 2016115197 A1 | 7/2016 |
| WO | 2016118711 A1 | 7/2016 |

OTHER PUBLICATIONS

2 Inflow Performance; "Well Performance" available as of Jul. 2, 2014 at: http://www.advntk.com/pwrijip2003/pwri/toolbox/monitoring/well_performance/well_performance.htm; pp. 1-40.

Al-Khalifa, A.J. et al.; "Multiphase Well Test Analysis: Pressure and Pressure-Squared Methods" SPE 18803, SPE California Regional Meeting; Bakersfield, California, Apr. 5-7, 1989; pp. 581-590.

Al-Mutairi, Saad et al., "Fully Integrated Approach Using Temperature Measurements to Describe Complex Reservoirs: Case Study from Saudi Arabia" SPE 166159, SPE Annual Technical Conference and Exhibition held in New Orleans Louisiana, 2013, pp. 1-13.

Anbarci, K. et al.; "Determination of Front Locations in a Multilayer Composite Reservoir" SPE 19799, The 64th Annual Technical Conference and Exhibition of the Society of Petroleum Engineers; San Antonio, Texas, Oct. 9-11, 1989; pp. 285-296.

Anisur Rahman, N.M. et al.; "Profiling Pressure-Dervative Values—A New, Innovative Way to Estimate the Radii of Investigation in Heterogeneous Reservoir Systems" SPE 164217, SPE Middle East Oil & Gas Show, Bahrain, Mar. 10-13, 2013; pp. 1-12.

Atkinson, C., et al.; "Flow Performance of Horizontal Wells with Inflow Control Devices" Euro. Jnl of Applied Mathmatics (2004), vol. 15, pp. 409-450.

Bahrami, Hassan et al.; "Second derivative yields new insights to well test analysis" Oil & Gas Journal; Dec. 5, 2005; 103, 45; ProQuest, pp. 46-51.

(56) References Cited

OTHER PUBLICATIONS

Bahrami, Hassan et al.; "Using Second Derivative of Transient Pressure in Welltest Analysis of Low Permeability Gas Reservoirs" SPE 132475, SPE Production and Operations Conference & Exhibition, Tunisia, Jun. 8-10, 2010; pp. 1-9.
Bakulin, Andrey et al.; "Acoustic signatures of crossflow behind casing in commingled reservoirs: A case study from Teapot Dome" Geophysics, vol. 73, No. 4, Jul.-Aug. 2008; pp. E145-E152.
Binakresh, Saud A et al., "Modeling Pressure-Transient Data for Characterizing the Formation Damage in Water Injection Wells Operating above the Fracturing Pressure", SPE-174278-MS, SPE European Formation Damage Conference and Exhibition, 2015, pp. 1-12.
Binakresh, Saud A., et al. "Challenges in Interpreting Well Testing Data from Fractured Water Injection Wells with a Dual Storage Phenomenon" SPE 139587; SPE Middle East Oil and Gas Show and Conference; Sep. 25-28, 2011; pp. 1-11.
Birchenko, V. M., et al., Analytical Modelling of Wells with Inflow Control Devices; Institute of Petroleum Engineering, Heriot-Watt University, Jul. 2010; pp. 1-134.
Bixel, H.C et al.; "Effect of Linear Discontinuities on Pressure Build-Up and Drawdown Behavior" SPE 611, Journal of Petroleum Technology, Aug. 1963; pp. 885-895.
Bourdet, D.; "Chapter 1: Principles of Transient Testing" Well Test Analysis: The Use of Advanced Interpretation Models, 2002, pp. 1-23.
Bourdet, D.; "Chapter 2: The Analysis Methods" Well Test Analysis: The Use of Advanced Interpretation Models, 2002, pp. 25-46.
Bourdet, Dominique et al.; "Use of Pressure Derivative in Well-Test Interpretation" SPE 12777, SPE Formation Evaluation, Jun. 1989; pp. 293-302.
Bourgeois, Marcel J. et al.; "Use of Second Pressure Derivative for Automatic Model Identification in Well Test Analysis" SPE 36659, SPE Annual Technical Conference and Exhibition, Denver, CO, Oct. 6-9, 1996; pp. 1-2.
Chengtai, Gao et al.: "The Crossflow Behavior and the determination of Reservoir Parameters by Drawdown Tests in Multilayer Reservoirs" SPE 12580, 1983, Society of Petroleum Engineers 1983, pp. 1-31.
Cheng-Tai, Gao; "Single-Phase Fluid Flow in a Stratified Porous Medium With Crossflow" Society of Petroleum of Engineers Journal, Feb. 1984; pp. 97-106.
Chu, Wei-Chun et al., "Pressure Transient Analysis of Two-Phase Flow Problems", SPE Formation Evaluation, Society of Petroleum Engineers, 198; pp. 151-164.
Related U.S. Appl. No. 14/182,430, tiled Measuring Behind Casing Hydraulic Conductivity Between Reservoir Layers filed Feb. 18, 2014; pp. 1-41.
Related U.S. Appl. No. 14/595,299, tiled Measuring Inter-Reservoir Cross Flow Rate Between Adjacent Reservoir Layers From Transient Pressure Tests filed Jan. 13, 2015; pp. 1-50.
Related U.S. Appl. No. 14/601,769, tiled Measuring Inter-Reservoir Cross Flow Rate Through Unintended Leaks in Zonal Isolation Cement Sheaths in Offset Wells filed Jan. 21, 2015; pp. 1-62.
Eaton, Ben A. "Fracture Gradient Prediction and Its Application in Oilfield Operations" Journal of Petroleum Technology; Oct. 1969; pp. 1353-1360.
Ehlig-Economides, Christine A. et al.; "A New Test for Determination of Individual Layer Properties in a Multilayered Reservoir," SPE 14167, SPE Formation Evaluation, Sep. 1987; pp. 261-283.
Ehlig-Economides C. et al.; "Vertical Interference Testing Across a Low-Permeability Zone", SPE Formation Evaluation, Oct. 1986, Society of Petroleum Engineers; pp. 497-510.
Everdingen et al., "The Skin Effect and Its Influence on the Productive Capacity of a Well", Petroleum Transactions, 1953, vol. 198, AIME, pp. 171-176.
Furui, "A Comprehensive Skin Factor Model for Well Completions Based on Finite Element Simulations", Presented to the Faculty of the Graduate School of University of Texas at Austin, 2004, pp. 1-182.

Gringarten, A.C.; "From Straight Lines to Deconvolution: The Evolution of the State of the Art in Well Test Analysis" SPE 102079, 2006 SPE Annual Technical Conference & Exhibition, San Antonio, Texas, Sep. 24-27, 2006; pp. 41-62.
International Search Report and Written Opinion for International Application No. PCT/US2013/027949 dated Feb. 17, 2014; pp. 1-11.
International Search Report and Written Opinion for International Application No. PCT/US2015/015610 dated Jun. 29, 2015; pp. 1-12.
International Search Report and Written Opinion for International Application No. PCT/US2016/013147 dated Jul. 4, 2016; pp. 1-19.
International Search Report and Written Opinion for International Application No. PCT/US2016/014260 dated Jun. 13, 2016; pp. 1-11.
International Search Report and Written Opinion for International Application No. PCT/US2016/016330 dated Jun. 7, 2016; pp. 1-14.
International Search Report and Written Opinion for International Application No. PCT/US2017/017143 dated Apr. 5, 2017; pp. 1-19.
International Search Report and Written Opinion for International Application No. PCT/US2018/030769 dated Aug. 10, 2018; pp. 1-15.
Kamal, Medhat M. et al.; "Pressure Transient Testing Under Multiphase Flow Conditions" SPE 141572, SPE Middle East Oil and Gas Show and Conference; Manama, Bahrain, 2011; pp. 1-10.
Kremenetskiy, M.I. et al.; "Well-Test Interpretation with Behind-the-Casing Crossflows", SPE 115323, SPE Russian Oil & Gas Technical Conference and Exhibition; Moscow, Russia, Oct. 28-30; pp. 1-12.
Kuchuk, F.J.: "Radius of Investigation for Reserve Estimation From Pressure Transient Well Tests," SPE 120515, SPE Middle East Oil and Gas Show and Conference, Manama, Bahrain, Mar. 15-18, 2009. pp. 1-21.
Li, Zhuoyi et al., "Understanding the Roles of Inflow-Control Devices in Optimizing Horizontal-Well Performance" SPE 124677, SPE Annual Technical Conference, Oct. 4-7, 2009; pp. 376-385.
Morris, C. W., et al.. Analysis of Geothermal Wells in Naturally Fractured Formations With Rate-Senstive Flow; SPE Formation Evaluation; Dec. 1, 1987; pp. 567-572.
Ouyang, Liang-Biao; "Practical Consideration of an Inflow Control Device Application for Reducing Water Production" SPE 124154, SPE Annual Technical Conference and Exhibition, Oct. 4-7, 2009, pp. 1-19.
Partial Search Report for International Application No. PCT/US2016/013147 dated Apr. 26, 2016; pp. 1-5.
Perrine, R.L.; "Analysis of Pressure-buildup Curves", Presented at the spring meeting of the Pacific Coast District, Division of Production, May 1956, pp. 482-509.
PetroWiki; "Permeability determination" available as of Jan. 31, 2020 at: https://petrowiki.org/Permeability_determination; pp. 1-6.
Schlumberger; "Well Test Interpretation" Jan. 1, 2002; http://www.fanarco.net/books/reservoir/Well_Test_Interpretation_Schlumberger.pdf; pp. 1-128.
Schrenkel, Jack "Field Examples of Barrier Detection With Unsteady-State Techniques" SPE-175, Fall Meeting of The Society Of Petroleum Engineers of Aime, Oct. 11, 1961; pp. 1-6.
Spivey, J.P. et al.; "Variable Wellbore Storage Models for a Dual-Volume Wellbore" SPE 56615; SPE Annual Technical conference and Exhibition; Oct. 3-6, 1999; pp. 1-10.
Stehfest, Harald; "Algorithm 368 Numerical Inversion of Laplace Transforms" Communications of the ACM, vol. 13, No. 1, Jan. 1970; pp. 47-54.
Su, Ho-Jeen et al., "Modeling of Equalizer Production System and Smart-Well Applications in Full-Field Studies" SPE 111288, SPE Reservoir Evaluation & Engineering, Apr. 2009; pp. 319-328.
Van den Hoek, "Pressure Transient Analysis in Fractured Produced Water Injection Wells" SPE 77946; SPE Asia Pacific Oil & Gas Conference and Exhibition; Oct. 8-10, 2002; pp. 1-16.
Zheng, Shiyi et al.; "New Approaches for Analyzing Transient Pressure from Oil and Water Two-Phase Flowing Reservoir" SPE 127615, 2009 Kuwait International Petroleum Conference and Exhibition, Dec. 14-16, 2009, pp. 1-25.

(56) References Cited

OTHER PUBLICATIONS

International Search Report and Written Opinion for International Application No. PCT/US2021/034986, dated Sep. 29, 2021; pp. 1-16.
Suri, Y. et al.; "A Comparative Analysis of Offshore and Onshore Fields Using Derivative and Second Derivative Plot (Without Type Curves)" Petroleum Science and Technology, 32 (2014); pp. 535-542.

* cited by examiner

SYSTEMS AND METHODS FOR TRANSIENT TESTING OF HYDROCARBON WELLS

FIELD

Embodiments relate generally to developing hydrocarbon reservoirs and, more particularly, to transient testing of hydrocarbon wells.

BACKGROUND

A hydrocarbon reservoir is a pool of hydrocarbons (e.g., oil or gas) trapped in a subsurface rock formation. Hydrocarbon wells are often drilled into hydrocarbon reservoirs to extract (or "produce") the trapped hydrocarbons. Understanding the characteristics of a hydrocarbon reservoir can be beneficial for making critical decisions regarding how to develop the reservoir. For example, reservoir characteristics, such as reservoir permeability (which characterizes the ability of reservoir rock to transmit fluids, such as oil or water), can be used to assess a reservoir's ability to produce hydrocarbons and to determine optimal techniques for drilling into and producing hydrocarbons from the reservoir. In some instances, development of a hydrocarbon reservoir involves conducting various tests, such as transient testing of hydrocarbon wells in the reservoir, to identify characteristics of the reservoir.

SUMMARY

Although there are numerous existing techniques for assessing characteristics of a hydrocarbon reservoir, many suffer from shortcomings that make them unreliable or impractical. For example, permeability of a reservoir may be determined based on laboratory assessment of rock samples (or "cores") extracted from wellbores of wells in the reservoir. As a further example, permeability of a reservoir may be derived from well logging, such as nuclear magnetic resonance (NMR) well logging. Although these types of assessments can provide useful estimates of permeability, they typically require running a logging tool along the wellbore of the well, which can introduce complications and they are typically time consuming and costly.

In some instances, characteristics, such as reservoir permeability, can be derived from pressure measurements obtained during testing or operation of a well. For example, trends in measured values of well pressure obtained during pressure transient testing of a well may be assessed to determine permeability of one or more portions of the reservoir surrounding the well. Although this type of assessment can be desirable from the perspective of the simplicity of the tests and the availability of the data, the ultimate determinations may be dependent on the conditions under which the measurements are taken and how they are processed, and, thus, may not provide an accurate characterization of the reservoir.

Recognizing these and other shortcomings of existing techniques for pressure transient testing of a well, provided are embodiments of improved techniques for pressure transient testing of a well in a reservoir, and characterizing and developing a reservoir based on the pressure transient testing. Certain embodiments include the following: (a) conducting a pressure transient test (e.g., a well build-up or well draw-down test); (b) obtaining pressure transient test data that includes measurements of bottomhole pressure across a given interval of time during the pressure transient test (e.g., a sequence of time series measurements of bottomhole pressure for a given number of hours following the start of the pressure transient test); (c) conducting a time function superposition that includes constructing and applying a superposition time function for prior changes in flowrates for the measurements of bottomhole pressure to generate superposition times for the measurements of bottomhole pressure across the given interval of time; (d) determining first order derivative (FOD) values for the measurements of bottomhole pressure across the given interval of time based on the superposition times and corresponding measurements of bottomhole pressure across the given interval of time; (e) determining second order derivative (SOD) values for the measurements of bottomhole pressure across the given interval of time based on the FOD values for the measurements of bottomhole pressure across the given interval of time; and (f) determining reservoir characteristics for the hydrocarbon reservoir (e.g., reservoir permeability) based on the SOD values for the measurements of bottomhole pressure across the given interval of time. In some embodiments, the SOD is determined based on the following equation:

$$SOD = (\Delta t)^2 = \frac{\partial^2 p}{\partial (\Delta t)^2} \qquad (1)$$

This definition of SOD may provide non-zero magnitudes of SOD, which enables presentations of the SOD with elapsed time on both semi-log and log-log plots, for use in assessing reservoir characteristics, such as reservoir heterogeneity.

Provided in some embodiments is a method of developing a hydrocarbon reservoir that includes the following: conducting a build-up test of a hydrocarbon well having a wellbore extending into a hydrocarbon reservoir, the build-up test including: conducting a shut-in of the hydrocarbon well to inhibit production flow from the wellbore of the hydrocarbon well; and obtaining, by way of a downhole pressure sensor disposed in the wellbore of the hydrocarbon well, pressure transient test data that includes a number (n) of pressure data points corresponding to measurements of bottomhole pressure across a given interval of time during the shut-in of the hydrocarbon well; conducting, for the pressure data points, a time function superposition that includes application of a superposition time function to generate superposition times for the measurements of bottomhole pressure across the given interval of time, the application of the superposition time function including applying the following superposition time function $T(\Delta t)$ to each of the pressure data points to generate a superposition time ($T_i$) for each of the measurements of bottomhole pressure across the given interval of time:

$$T(\Delta t) = \frac{\sum_{i=1}^{n-1}(q_i - q_{i-1})\ln\left(\sum_{j=i}^{n-1}\Delta t_j + \Delta t\right)}{q_n - q_{n-1}} + \ln(\Delta t)$$

where: $\Delta t$ is an elapsed time since a last flow-rate change of the hydrocarbon well to a current time; n is a number of changes in flowrate of the hydrocarbon well since the hydrocarbon well has been subject to its first production or injection to a current time of the elapsed time, $\Delta t$, $q_i$ is the $i^{th}$ rate of production of the hydrocarbon well at respective points in time sequence in standard conditions from the wellbore of the hydrocarbon well, including the rate of production at a current time defined by the elapsed time, $\Delta t$, and $q_n$ is the $n^{th}$ rate of production of the hydrocarbon well; determining, based on the superposition times and corresponding measurements of bottomhole pressure across the given interval of time, FOD values for the measurements of bottomhole pressure across the given interval of time, the determining of the FOD value for each of the measurements of bottomhole pressure across the given interval of time including applying of the following first order equation ($FOD_i$) to the each of the measurements of bottomhole pressure across the given interval of time to generate a FOD value for each of the measurements of bottomhole pressure across the given interval of time:

$$FOD_i = \left(\frac{\partial p}{\partial T}\right)_i = \frac{\left(\frac{\Delta p_1}{\Delta T_1}\right)\Delta T_2 + \left(\frac{\Delta p_2}{\Delta T_2}\right)\Delta T_1}{\Delta T_1 + \Delta T_2}$$

where: $\Delta p_1$ is a difference between a pressure associated with the measurement (i) and a pressure associated with the preceding measurement (i−1), $\Delta T_1$ is a difference between a superposition time associated with the measurement (i) and a superposition time associated with a preceding measurement (i−1), $\Delta p_2$ is a difference between the pressure associated with the measurement (i) and a pressure associated with a subsequent measurement (i+1), and $\Delta T_2$ is a difference between the superposition time associated with the measurement (i) and a superposition time associated with the subsequent measurement (i+1); determining, based on the FOD values for the measurements of bottomhole pressure across the given interval of time, SOD values for the measurements of bottomhole pressure across the given interval of time, the determining of the SOD values for the measurements of bottomhole pressure across the given interval of time including applying of the following second order equation ($SOD_i$) to each of the FOD values for the measurements of bottomhole pressure across the given interval of time to generate a SOD value for each of the measurements of bottomhole pressure across the given interval of time:

$$SOD_i = \left(\frac{\partial FOD}{\partial T}\right)_i - FOD_i$$

where, $$\left(\frac{\partial FOD}{\partial T}\right)_i = \frac{\left(\frac{\Delta FOD_1}{\Delta T_1}\right)\Delta T_2 + \left(\frac{\Delta FOD_2}{\Delta T_2}\right)\Delta T_1}{\Delta T_1 + \Delta T_2}$$

and where, $\Delta FOD_1$ is a difference between a FOD associated with the measurement (i) and a FOD associated with a preceding measurement (i−1), $\Delta T_1$ is a difference between a superposition time associated with the measurement (i) and a superposition time associated with a preceding measurement (i−1), $\Delta FOD_2$ is a difference between the FOD associated with the measurement (i) and a FOD associated with a subsequent measurement (i+1), and $\Delta T_2$ is a difference between the superposition time associated with the measurement (i) and a superposition time associated with the subsequent measurement (i+1); and determining, based on the SOD values for the measurements of bottomhole pressure across the given interval of time, a reservoir characteristic for the hydrocarbon reservoir; determining, based on the reservoir characteristic for the hydrocarbon reservoir, operating parameters for a well in the hydrocarbon reservoir; and operating the well in accordance with the operating parameters.

In some embodiments, the method further includes generating a semi-log or log-log plot of the SOD values for the measurements of bottomhole pressure across the given interval of time. In certain embodiments, the reservoir characteristic for the hydrocarbon reservoir includes a permeability of the hydrocarbon reservoir. In some embodiments, the operating parameters for a well in the hydrocarbon reservoir include an operating well flowrate or operating well pressure.

Provided in some embodiments is method of developing a hydrocarbon reservoir that includes the following: obtaining, by way of a downhole pressure sensor disposed in the wellbore of the hydrocarbon well, pressure transient test data that includes a number (n) of prior changes in the flowrates corresponding to measurements of bottomhole pressure across a given interval of time during pressure transient testing of the hydrocarbon well; conducting, for the pressure data points, a time function superposition that includes application of a superposition time function to generate superposition times for the measurements of bottomhole pressure across the given interval of time, the application of the superposition time function including applying the following superposition time function $T(\Delta t)$ to each of the pressure data points to generate a superposition time ($T_i$) for each of the measurements of bottomhole pressure across the given interval of time:

$$T(\Delta t) = \frac{\sum_{l=1}^{n-1}(q_l - q_{l-1})\ln\left(\sum_{j=l}^{n-1}\Delta t_j + \Delta t\right)}{q_n - q_{n-1}} + \ln(\Delta t)$$

where: $\Delta t$ is an elapsed time since a last flowrate change of the hydrocarbon well to a current time; n is a number of changes in flowrate of the hydrocarbon well since the hydrocarbon well has been subject to its first production or injection to the current time of the elapsed time, $\Delta t$, $q_l$ is the $l^{th}$ rate of production of the hydrocarbon well at respective points in time sequence in standard conditions from the wellbore of the hydrocarbon well, including the rate of production at current time defined by the elapsed time, $\Delta t$, and $q_n$ is the $n^{th}$ rate of production of the hydrocarbon well; determining, based on the superposition times and corresponding measurements of bottomhole pressure across the given interval of time, FOD values for the measurements of bottomhole pressure across the given interval of time, the determining of the FOD value for each of the measurements of bottomhole pressure across the given interval of time including applying of the following first order equation ($FOD_1$) to the each of the measurements of bottomhole pressure across the given interval of time to generate a FOD value for each of the measurements of bottomhole pressure across the given interval of time:

$$FOD_i = \left(\frac{\partial p}{\partial T}\right)_i = \frac{\left(\frac{\Delta p_1}{\Delta T_1}\right)\Delta T_2 + \left(\frac{\Delta p_2}{\Delta T_2}\right)\Delta T_1}{\Delta T_1 + \Delta T_2}$$

where: $\Delta p_1$ is a difference between a pressure associated with the measurement (i) and a pressure associated with the preceding measurement (i−1), $\Delta T_1$ is a difference between a superposition time associated with the measurement (i) and a superposition time associated with a preceding measurement (i−1), $\Delta p_2$ is a difference between the pressure associated with the measurement (i) and a pressure associated with a subsequent measurement (i+1), and $\Delta T_2$ is a difference between the superposition time associated with the measurement (i) and a superposition time associated with the subsequent measurement (i+1); determining, based on the FOD values for the measurements of bottomhole pressure across the given interval of time, SOD values for the measurements of bottomhole pressure across the given interval of time, the determining of the SOD values for the measurements of bottomhole pressure across the given interval of time including applying of the following second order equation ($SOD_i$) to each of the FOD values for the measurements of bottomhole pressure across the given interval of time to generate a SOD value for each of the measurements of bottomhole pressure across the given interval of time:

$$SOD_i = \left(\frac{\partial FOD}{\partial T}\right)_i - FOD_i$$

where, $$\left(\frac{\partial FOD}{\partial T}\right)_i = \frac{\left(\frac{\Delta FOD_1}{\Delta T_1}\right)\Delta T_2 + \left(\frac{\Delta FOD_2}{\Delta T_2}\right)\Delta T_1}{\Delta T_1 + \Delta T_2}$$

and where, $\Delta FOD_1$ is a difference between a FOD associated with the measurement (i) and a FOD associated with a preceding measurement (i−1), $\Delta T_1$ is a difference between a superposition time associated with the measurement (i) and a superposition time associated with a preceding measurement (i−1), $\Delta FOD_2$ is a difference between the FOD associated with the measurement (i) and a FOD associated with a subsequent measurement (i+1), and $\Delta T_2$ is a difference between the superposition time associated with the measurement (i) and a superposition time associated with the subsequent measurement (i+1); and generating a semi-log or log-log plot of the SOD values for the measurements of bottomhole pressure across the given interval of time.

In some embodiments, the method further includes conducting the pressure transient testing of the hydrocarbon well. In certain embodiments, the pressure transient testing of the hydrocarbon well includes conducing a build-up test of the hydrocarbon well that includes conducting a shut-in of the hydrocarbon well to inhibit production flow from the wellbore of the hydrocarbon well. In some embodiments, the pressure transient testing of the hydrocarbon well includes conducing a draw-down test of the hydrocarbon well that includes opening the hydrocarbon well to increase production flow from the wellbore of the hydrocarbon well. In certain embodiments, the method further includes determining, based on the SOD values for the measurements of bottomhole pressure across the given interval of time, a reservoir characteristic for the hydrocarbon reservoir. In some embodiments, the reservoir characteristic for the hydrocarbon reservoir includes a permeability of the hydrocarbon reservoir. In some embodiments, the method further includes the following: determining, based on the reservoir characteristic for the hydrocarbon reservoir, operating parameters for a well in the hydrocarbon reservoir; and operating the well in accordance with the operating parameters. In certain embodiments, the operating parameters for a well in the hydrocarbon reservoir include an operating well flowrate or operating well pressure.

Provided in some embodiments is a system for developing a hydrocarbon reservoir that includes the following: a processor; and a non-transitory computer readable storage medium including program instructions stored thereon that are executable by the processor to perform the following operations: obtaining, by way of a downhole pressure sensor disposed in the wellbore of the hydrocarbon well, pressure transient test data that includes a number (n) of the prior changes in flowrates in the history corresponding to measurements of bottomhole pressure across a given interval of time during pressure transient testing of the hydrocarbon well; conducting, for the pressure data points, a time function superposition that includes application of a superposition time function to generate superposition times for the measurements of bottomhole pressure across the given interval of time, the application of the superposition time function including applying the following superposition time function $T(\Delta t)$ to each of the pressure data points to generate a superposition time ($T_i$) for each of the measurements of bottomhole pressure across the given interval of time:

$$T(\Delta t) = \frac{\sum_{l=1}^{n-1}(q_l - q_{l-1})\ln\left(\sum_{j=l}^{n-1}\Delta t_j + \Delta t\right)}{q_n - q_{n-1}} + \ln(\Delta t)$$

where: $\Delta t$ is an elapsed time since a last flowrate change of the hydrocarbon well to a current time, n is a number of changes in flowrate of the hydrocarbon well since the hydrocarbon well has been subject to its first production or injection to the current time of the elapsed time, $\Delta t$, $q_l$ is the $l^{th}$ rate of production of the hydrocarbon well at respective points in time sequence in standard conditions from the wellbore of the hydrocarbon well, including the rate of production at current time defined by the elapsed time, $\Delta t$, and $q_n$ is the $n^{th}$ rate of production of the hydrocarbon well; determining, based on the superposition times and corresponding measurements of bottomhole pressure across the given interval of time, FOD values for the measurements of bottomhole pressure across the given interval of time, the determining of the FOD value for each of the measurements of bottomhole pressure across the given interval of time including applying of the following first order equation ($FOD_i$) to the each of the measurements of bottomhole pressure across the given interval of time to generate a FOD value for each of the measurements of bottomhole pressure across the given interval of time:

$$FOD_i = \left(\frac{\partial p}{\partial T}\right)_i = \frac{\left(\frac{\Delta p_1}{\Delta T_1}\right)\Delta T_2 + \left(\frac{\Delta p_2}{\Delta T_2}\right)\Delta T_1}{\Delta T_1 + \Delta T_2}$$

where: $\Delta p_1$ is a difference between a pressure associated with the measurement (i) and a pressure associated with the preceding measurement (i−1), $\Delta T_i$ is a difference between a superposition time associated with the measurement (i) and a superposition time associated with a preceding measurement (i−1), $\Delta p_2$ is a difference between the pressure associated with the measurement (i) and a pressure associated with a subsequent measurement (i+1), and $\Delta T_2$ is a difference between the superposition time associated with the measurement (i) and a superposition time associated with the subsequent measurement (i+1); determining, based on the FOD values for the measurements of bottomhole pressure across the given interval of time, SOD values for the measurements of bottomhole pressure across the given interval of time, the determining of the SOD values for the measurements of bottomhole pressure across the given interval of time including applying of the following second order equation ($SOD_i$) to each of the FOD values for the measurements of bottomhole pressure across the given interval of time to generate a SOD value for each of the measurements of bottomhole pressure across the given interval of time:

$$SOD_i = \left(\frac{\partial FOD}{\partial T}\right)_i - FOD_i$$

where, $$\left(\frac{\partial FOD}{\partial T}\right)_i = \frac{\left(\frac{\Delta FOD_1}{\Delta T_1}\right)\Delta T_2 + \left(\frac{\Delta FOD_2}{\Delta T_2}\right)\Delta T_1}{\Delta T_1 + \Delta T_2}$$

and where $\Delta FOD_1$ is a difference between a FOD associated with the measurement (i) and a FOD associated with a preceding measurement (i−1), $\Delta T_1$ is a difference between a superposition time associated with the measurement (i) and a superposition time associated with a preceding measurement (i−1), $\Delta FOD_2$ is a difference between the FOD associated with the measurement (i) and a FOD associated with a subsequent measurement (i+1), $\Delta T_2$ is a difference between the superposition time associated with the measurement (i) and a superposition time associated with the subsequent measurement (i+1); and generating a semi-log or log-log plot of the SOD values for the measurements of bottomhole pressure across the given interval of time.

In some embodiments, the operations further include conducting the pressure transient testing of the hydrocarbon well. In certain embodiments, the pressure transient testing of the hydrocarbon well includes conducing a build-up test of the hydrocarbon well that includes conducting a shut-in of the hydrocarbon well to inhibit production flow from the wellbore of the hydrocarbon well. In some embodiments, the pressure transient testing of the hydrocarbon well includes conducing a draw-down test of the hydrocarbon well that includes opening the hydrocarbon well to increase production flow from the wellbore of the hydrocarbon well. In certain embodiments, the operations further include determining, based on the SOD values for the measurements of bottomhole pressure across the given interval of time, a reservoir characteristic for the hydrocarbon reservoir. In some embodiments, the reservoir characteristic for the hydrocarbon reservoir includes a permeability of the hydrocarbon reservoir. In some embodiments, the operations further include: determining, based on the reservoir characteristic for the hydrocarbon reservoir, operating parameters for a well in the hydrocarbon reservoir; and operating the well in accordance with the operating parameters. In certain embodiments, the operating parameters for a well in the hydrocarbon reservoir include an operating well flowrate or operating well pressure.

Provided in some embodiments is a non-transitory computer readable storage medium including program instructions stored thereon that are executable by a processor to perform the following operations for developing a hydrocarbon reservoir: obtaining, by way of a downhole pressure sensor disposed in the wellbore of the hydrocarbon well, pressure transient test data that includes a number (n) of the prior changes in flowrates in the history corresponding to measurements of bottomhole pressure across a given interval of time during pressure transient testing of the hydrocarbon well; conducting, for the pressure data points, a time function superposition that includes application of a superposition time function to generate superposition times for the measurements of bottomhole pressure across the given interval of time, the application of the superposition time function including applying the following superposition time function $T(\Delta t)$ to each of the pressure data points to generate a superposition time ($T_i$) for each of the measurements of bottomhole pressure across the given interval of time:

$$T(\Delta t) = \frac{\sum_{l=1}^{n-1}(q_l - q_{l-1})\ln\left(\sum_{j=l}^{n-1}\Delta t_j + \Delta t\right)}{q_n - q_{n-1}} + \ln(\Delta t)$$

where: $\Delta t$ is an elapsed time since a last flowrate change of the hydrocarbon well to a current time, n is a number of changes in flowrate of the hydrocarbon well since the hydrocarbon well has been subject to its first production or injection to the current time of the elapsed time, $\Delta t$, $q_l$ is the $l^{th}$ rate of production of the hydrocarbon well at respective points in time sequence in standard conditions from the wellbore of the hydrocarbon well, including the rate of production at current time defined by the elapsed time, $\Delta t$, and $q_n$ is the $n^{th}$ rate of production of the hydrocarbon well; determining, based on the superposition times and corresponding measurements of bottomhole pressure across the given interval of time, FOD values for the measurements of bottomhole pressure across the given interval of time, the determining of the FOD value for each of the measurements of bottomhole pressure across the given interval of time including applying of the following first order equation ($FOD_i$) to the each of the measurements of bottomhole pressure across the given interval of time to generate a FOD value for each of the measurements of bottomhole pressure across the given interval of time:

$$FOD_i = \left(\frac{\partial p}{\partial T}\right)_i = \frac{\left(\frac{\Delta p_1}{\Delta T_1}\right)\Delta T_2 + \left(\frac{\Delta p_2}{\Delta T_2}\right)\Delta T_1}{\Delta T_1 + \Delta T_2}$$

where: $\Delta p_1$ is a difference between a pressure associated with the measurement (i) and a pressure associated with the preceding measurement (i−1), $\Delta T_1$ is a difference between a superposition time associated with the measurement (i) and a superposition time associated with a preceding measurement (i−1), $\Delta p_2$ is a difference between the pressure associated with the measurement (i) and a pressure associated with a subsequent measurement (i+1), and $\Delta T_2$ is a difference between the superposition time associated with the measurement (i) and a superposition time associated with the subsequent measurement (i+1); determining, based on the FOD values for the measurements of bottomhole pressure across the given interval of time, SOD values for the measurements of bottomhole pressure across the given interval of time, the determining of the SOD values for the measurements of bottomhole pressure across the given interval of time including applying of the following second order equation ($SOD_1$) to each of the FOD values for the measurements of bottomhole pressure across the given interval of time to generate a SOD value for each of the measurements of bottomhole pressure across the given interval of time:

$$SOD_i = \left(\frac{\partial FOD}{\partial T}\right)_i - FOD_i$$

where, $$\left(\frac{\partial FOD}{\partial T}\right)_i = \frac{\left(\frac{\Delta FOD_1}{\Delta T_1}\right)\Delta T_2 + \left(\frac{\Delta FOD_2}{\Delta T_2}\right)\Delta T_1}{\Delta T_1 + \Delta T_2}$$

and where, $\Delta FOD_1$ is a difference between a FOD associated with the measurement (i) and a FOD associated with a preceding measurement (i−1), $\Delta T_1$ is a difference between a superposition time associated with the measurement (i) and a superposition time associated with a preceding measurement (i−1), $\Delta FOD_2$ is a difference between the FOD associated with the measurement (i) and a FOD associated with a subsequent measurement (i+1), $\Delta T_2$ is a difference between the superposition time associated with the measurement (i) and a superposition time associated with the subsequent measurement (i+1); and generating a semi-log or log-log plot of the SOD values for the measurements of bottomhole pressure across the given interval of time.

In some embodiments, the operations further include conducting the pressure transient testing of the hydrocarbon well. In certain embodiments, the pressure transient testing of the hydrocarbon well includes conducing a build-up test of the hydrocarbon well that includes conducting a shut-in of the hydrocarbon well to inhibit production flow from the wellbore of the hydrocarbon well. In some embodiments, the pressure transient testing of the hydrocarbon well includes conducing a draw-down test of the hydrocarbon well that includes opening the hydrocarbon well to increase production flow from the wellbore of the hydrocarbon well. In certain embodiments, the operations further include determining, based on the SOD values for the measurements of bottomhole pressure across the given interval of time, a reservoir characteristic for the hydrocarbon reservoir. In some embodiments, the reservoir characteristic for the hydrocarbon reservoir includes a permeability of the hydrocarbon reservoir. In certain embodiments, the operations further include: determining, based on the reservoir characteristic for the hydrocarbon reservoir, operating parameters for a well in the hydrocarbon reservoir; and operating the well in accordance with the operating parameters. In some embodiments, the operations further include the operating parameters for a well in the hydrocarbon reservoir include an operating well flowrate or operating well pressure.

Figure 1:
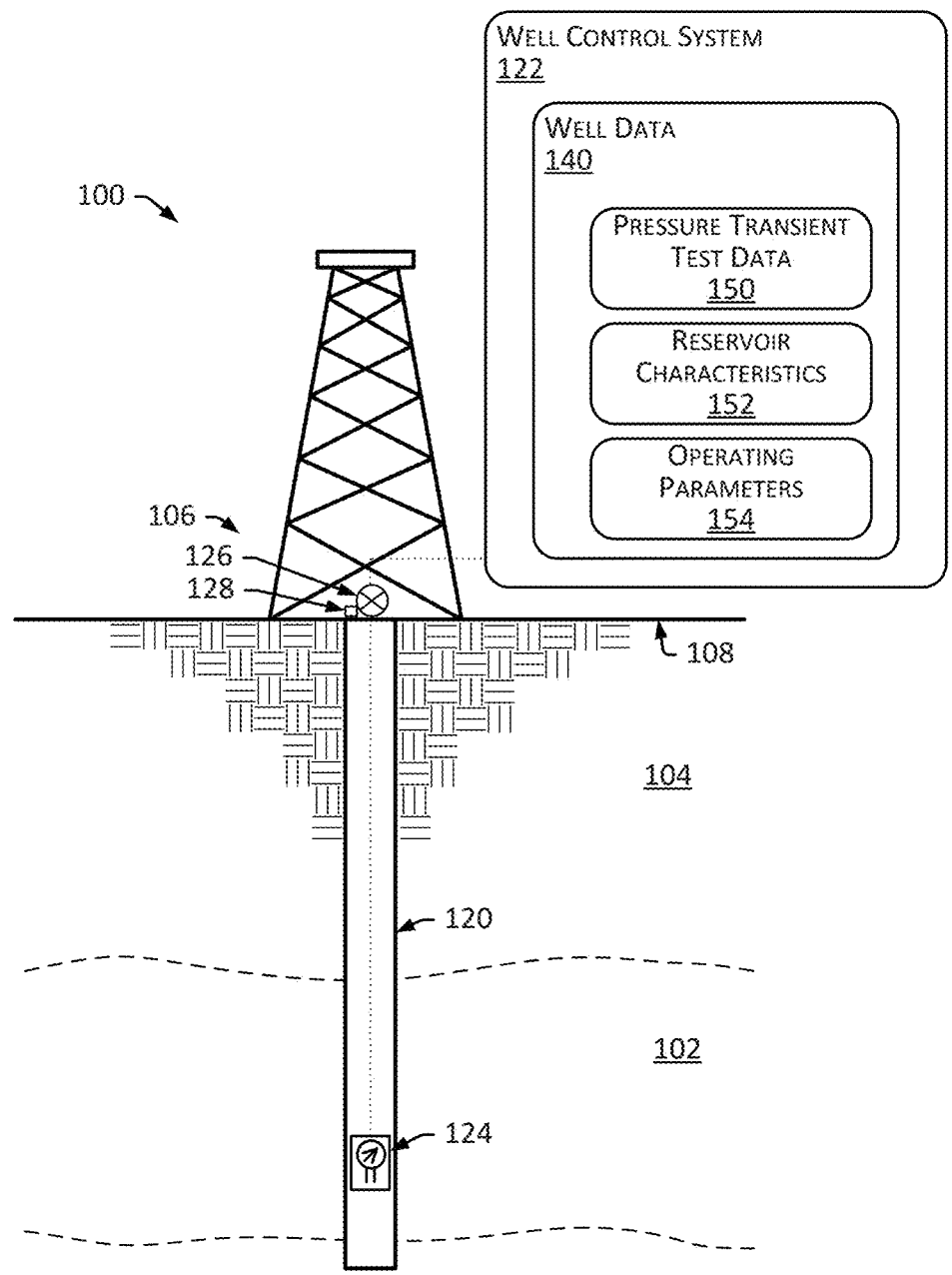
FIG. 1 is a diagram that illustrates a well environment in accordance with one or more embodiments.

While this disclosure is susceptible to various modifications and alternative forms, specific embodiments are shown by way of example in the drawings and will be described in detail. The drawings may not be to scale. It should be understood that the drawings and the detailed descriptions are not intended to limit the disclosure to the particular form disclosed, but are intended to disclose modifications, equivalents, and alternatives falling within the scope of the present disclosure as defined by the claims.

DETAILED DESCRIPTION

Described are embodiments of novel systems and methods for pressure transient testing of a well in a reservoir, and characterizing and developing a reservoir based on the pressure transient testing. Certain embodiments include the following: (a) conducting a pressure transient test (e.g., a well build-up or well draw-down test); (b) obtaining pressure transient test data that includes measurements of bottomhole pressure across a given interval of time during the pressure transient test (e.g., a sequence of time series measurements of bottomhole pressure for a given number of hours following the start of the pressure transient test); (c) conducting a time function superposition that includes constructing and applying a superposition time function for prior changes in flowrates for the measurements of bottomhole pressure to generate superposition times for the measurements of bottomhole pressure across the given interval of time; (d) determining first order derivative (FOD) values for the measurements of bottomhole pressure across the given interval of time based on the superposition times and corresponding measurements of bottomhole pressure across the given interval of time; (e) determining second order derivative (SOD) values for the measurements of bottomhole pressure across the given interval of time based on the FOD values for the measurements of bottomhole pressure across the given interval of time; and (f) determining reservoir characteristics for the hydrocarbon reservoir (e.g., reservoir permeability) based on the SOD values for the measurements of bottomhole pressure across the given interval of time. In some embodiments, the SOD is determined based on the following equation:

$$SOD = (\Delta t)^2 \frac{\partial^2 p}{\partial (\Delta t)^2} \qquad (1)$$

This definition of SOD may provide non-zero magnitudes of SOD, which enables presentations of the SOD with elapsed time on both semi-log and log-log plots, for use in assessing reservoir characteristics, such as reservoir heterogeneity.

FIG. 1 is a diagram that illustrates a well environment 100 in accordance with one or more embodiments. In the illustrated embodiment, the well environment 100 includes a reservoir ("reservoir") 102 located in a subsurface formation ("formation") 104, and a well system ("well") 106.

The formation 104 may include a porous or fractured rock formation that resides beneath the Earth's surface 108. The reservoir 102 may be a hydrocarbon reservoir defined by a portion of the formation 104 that contains (or that is determined to contain) a subsurface pool of hydrocarbons (e.g., oil and gas), and the well 106 may be a hydrocarbon well (e.g., an oil and gas well) that is operable to extract the hydrocarbons from the reservoir 102. The formation 104 and the reservoir 102 may each include different layers of rock having varying characteristics, such as varying degrees of lithology, permeability, porosity and fluid saturation. In the case of the well 106 being operated as a production well, the well 106 may facilitate the extraction of hydrocarbons (or "production") from the reservoir 102. In the case of the well 106 being operated as an injection well, the well 106 may facilitate the injection of substances (e.g., gas or water) into the formation 104. In the case of the well 106 being operated as a monitoring well, the well 106 may facilitate the monitoring of various characteristics of the formation 104, such as reservoir saturation or reservoir pressure.

The well 106 may include a wellbore 120 and a well control system ("control system") 122. The control system 122 may control various operations of the well 106, such as well drilling operations, well completion operations, well production operations, or well and formation testing and monitoring operations. In some embodiments, the control system 122 includes a computer system that is the same as or similar to that of computer system 1000 described with regard to at least FIG. 11.

The wellbore 120 may include a bored hole (or "borehole") that extends from the surface 108 into a target zone of the formation 104, such as the reservoir 102. An upper end of the wellbore 120 located at or near the surface 108 may be referred to as the "up-hole" end of the wellbore 120. A lower end of the wellbore 120 that terminates in the formation 104 may be referred to as the "down-hole" end of the wellbore 120. The wellbore 120 may be created, for example, by a drill bit boring through the formation 104. The wellbore 120 may provide for the circulation of drilling fluids during drilling operations, direct the flow of hydrocarbons (e.g., oil and gas) from the reservoir 102 to the surface 108 during production operations, direct the injection of substances (e.g., water or gas) into the reservoir 102 during injection operations, or provide a path for the communication and placement of sensing devices in the reservoir 102 for monitoring operations (e.g., enable the running of wellbore logging tools during wellbore logging operations or the placement of downhole pressure sensors used to monitor downhole wellbore pressure during well flowing or shut-in conditions).

In some embodiments, the well 106 includes a downhole pressure sensor 124. The downhole pressure sensor 124 may include, for example, a pressure gauge disposed in the wellbore 120 that is operable to acquire measurements of pressure within the wellbore 120. In some embodiments, the downhole pressure sensor 124 is disposed at a depth within the wellbore 120 that corresponds to a depth interval of the reservoir 102. For example, where the reservoir 102 has an upper boundary at about 1,000 meters (m) and a lower boundary at about 2,000 m, the downhole pressure sensor 124 may be located within a depth interval of about 1,000 m to about 2,000 m within the wellbore 120. In some embodiments, the downhole pressure sensor 124 is a high resolution pressure sensor. For example, the downhole pressure sensor 124 may include a high resolution pressure gauge that is capable of measuring pressure at resolution of about 0.003 pounds per square inch absolute (psia) or higher resolution, and at a sampling frequency of one data point per second or higher frequency. In some embodiments, the downhole pressure sensor 124 is operable to acquire measurements of pressure within the wellbore 120 during pressure transient testing of the well 106. For example, the downhole pressure sensor 124 may acquire a sequence of time series measurements of pressure within the wellbore 120 for a given interval of time during a build-up or draw-down type pressure transient testing of the well 106.

In some embodiments, the well 106 includes a flow control valve system 126. The flow control valve system 126 may include, for example, one or more valves that is operable to regulate the flow of production from the wellbore 120. For example, the flow control valve system 126 may include a valve that can be fully opened to enable full production flow from the wellbore 120, partially opened/closed to throttle production flow from the wellbore 120, or fully closed to inhibit production flow from the wellbore 120. The flow control valve system 126 may, for example, be set to an opening size for a given duration of time to enable the flowrate of production to stabilize at a given flowrate (e.g., to within about +/−5% of the given flowrate). In some embodiments, the downhole pressure sensor 124 is disposed downhole of the flow control valve system 126. This may enable the downhole pressure sensor 124 to sense reservoir pressure (or "formation pressure") without changes in pressure attributable to the production flow across the flow control valve system 126.

In some embodiments, the well 106 includes a production flowrate sensor 128. The production flowrate sensor 128 may include, for example, a flow gauge disposed at the surface 108 (or downhole) that is operable to acquire measurements of the flowrate of production from wellbore 120 (or "production flowrate"). In some embodiments, the production flowrate sensor 128 is operable to acquire measurements production flowrate during pressure transient testing of the well 106. For example, the production flowrate sensor 128 may acquire a sequence of time series measurements of production flow rate for a given interval of time during a build-up or draw-down type pressure transient testing of the well 106.

In some embodiments, a build-up type pressure transient test of the well 106 includes acquiring pressure measurements for a resumption to steady state production. For example, a build-up test of the well 106 may include operating the well 106 with the flow control valve system 126 opened to achieve a stabilized production flowrate from the wellbore 120, and, then, suddenly closing the flow control valve system 126 to inhibit the flow of production from the wellbore 120 (or "shutting-in" the well 106) and monitoring the pressure response of the well 106 to the halt of production flow. This may include, for example, acquiring a sequence of time series measurements of pressure within the wellbore 120 for a given interval of time after the closing of the flow control valve system 126. The interval of time may be, for example, the 1,000 hours immediately following the closing of the flow control valve system 126. The measurements of pressure may be, for example, downhole pressure measurements acquired by way of the downhole pressure sensor 124 during the shut-in of the well 106. The term "build-up" may be associated with the expectation that pressure in the wellbore 120 will increase during the shut-in of the well 106. The "build-up" pressure transient test data may be used, for example, to assess various characteristics of the reservoir 102, such as reservoir permeability, flow capacity and flow restricting damage.

In some embodiments, a draw-down type pressure transient test of the well 106 includes acquiring pressure measurements for an increase in steady state production. For example, a draw-down type pressure transient test of the well 106 may include operating the well 106 with the flow control valve system 126 closed to inhibit the flow of production from the wellbore 120 (or "shutting-in" the well 106), and, then, opening the flow control valve system 126 (or "opening" the well 106) to achieve a stabilized production flowrate from the wellbore 120 and monitoring the pressure response of the well 106 to the resumption of production flow. This may include, for example, acquiring a sequence of time series measurements of pressure within the wellbore 120 for a given interval of time after the opening of the flow control valve system 126. The interval of time may be, for example, the 1,000 hours immediately following the opening of the flow control valve system 126. The measurements of pressure may be, for example, downhole pressure measurements acquired by way of the downhole pressure sensor 124 during the draw-down of the well 106. As a further example, a draw-down test of the well 106 may include operating the well 106 with the flow control valve system 126 in a given open positon to achieve a steady production rate from the wellbore 120, and, then, further opening the flow control valve system 126 to achieve a second-increased steady production rate from the wellbore 120 and monitoring the response of the well 106 to the opening of the flow control valve system 126. This may include, for example, acquiring a sequence of time series measurements of pressure within the wellbore 120 for a given interval of time after the further opening of the flow control valve system 126. The interval of time may be, for example, the 1,000 hours immediately following the further opening of the flow control valve system 126. The measurements of pressure may be, for example, downhole pressure measurements acquired by way of the downhole pressure sensor 124 during the draw-down of the well 106. The term "draw-down" may be associated with the expectation that pressure in the wellbore 120 will decrease with an increased flowrate that follows opening of the well 106. The "draw-down" pressure transient test data may be used, for example, to assess various characteristics of the reservoir 102, such as reservoir permeability, flow capacity and flow restricting damage.

In some embodiments, the control system 122 stores, or otherwise has access to, well data 140. The well data 140 may include data that is indicative of various characteristics of the well 106, such as well pressure transient test data (or "pressure data") 150 for the well 106 and characteristics of the reservoir (or "reservoir characteristics") 152. In some embodiments, the control system 122 determines one or more of the reservoir characteristics 152 based on the pressure data 150, and the reservoir 102 is developed based on the reservoir characteristics 152 determined based on the pressure data 150. For example, the control system 122 may determine a reservoir permeability for the reservoir 102 based on SOD values for the measurements of bottomhole pressure obtained during pressure transient testing of the well 106, determine well operating parameters 154 for the well 106 (or other wells in the reservoir 102) based on the reservoir permeability for the reservoir 102, and control operation of the well 106 (or the other wells in the reservoir 102) in accordance with the well operating parameters 154.

In some embodiments, determining reservoir characteristics 152 based on the pressure data 150 includes the following: (a) conducting pressure transient testing of the well 106 (e.g., a well build-up or well draw-down type transient testing of the well 106); (b) obtaining pressure transient test data 150 that includes measurements of bottomhole pressure across a given interval of time during the pressure transient test of the well 106 (e.g., a sequence of time series measurements of bottomhole pressure for a given number of hours following the start of the pressure transient test of the well 106); (c) conducting a time function superposition that includes constructing and applying a superposition time function for prior changes in flowrates for the measurements of bottomhole pressure to generate superposition times for the measurements of bottomhole pressure across the given interval of time; (d) determining FOD values for the measurements of bottomhole pressure across the given interval of time based on the superposition times and corresponding measurements of bottomhole pressure across the given interval of time; (e) determining SOD values for the measurements of bottomhole pressure across the given interval of time based on the FOD values for the measurements of bottomhole pressure across the given interval of time; and (f) determining reservoir characteristics 152 for the reservoir 102 (e.g., reservoir permeability for the portion of the reservoir 102 surrounding the wellbore 120) based on the SOD values for the measurements of bottomhole pressure across the given interval of time. In some embodiments, the SOD is determined based on the following equation:

$$SOD = (\Delta t)^2 \frac{\partial^2 p}{\partial (\Delta t)^2} \qquad (1)$$

This definition of SOD may provide non-zero magnitudes of SOD, which enables presentation of the SOD with elapsed time on both semi-log and log-log plots, for use in assessing reservoir characteristics 152, such as reservoir heterogeneity, permeability, or the like.

Figure 2:
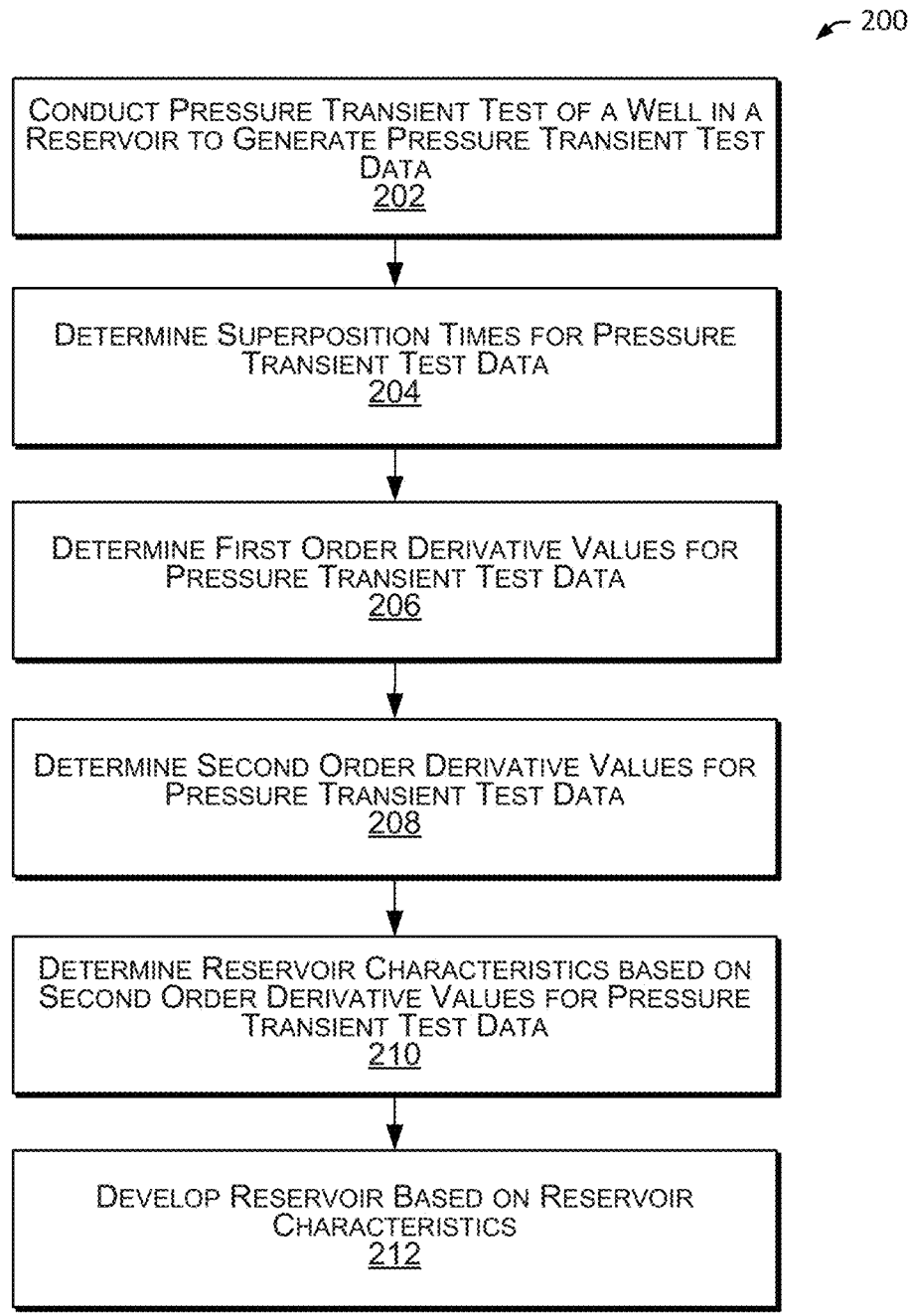
FIG. 2 is a flowchart that illustrates a method of determining reservoir characteristics based on second order derivatives of pressure transient test data and developing a hydrocarbon reservoir based on the reservoir characteristics, in accordance with one or more embodiments.
Figure 3:
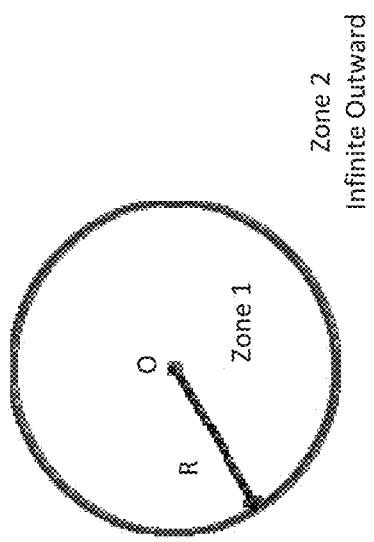
FIGS. 3-10 are diagrams that illustrate example utilizations of the described techniques for assessment of pressure transient test data in accordance with one or more embodiments.
Figure 4:
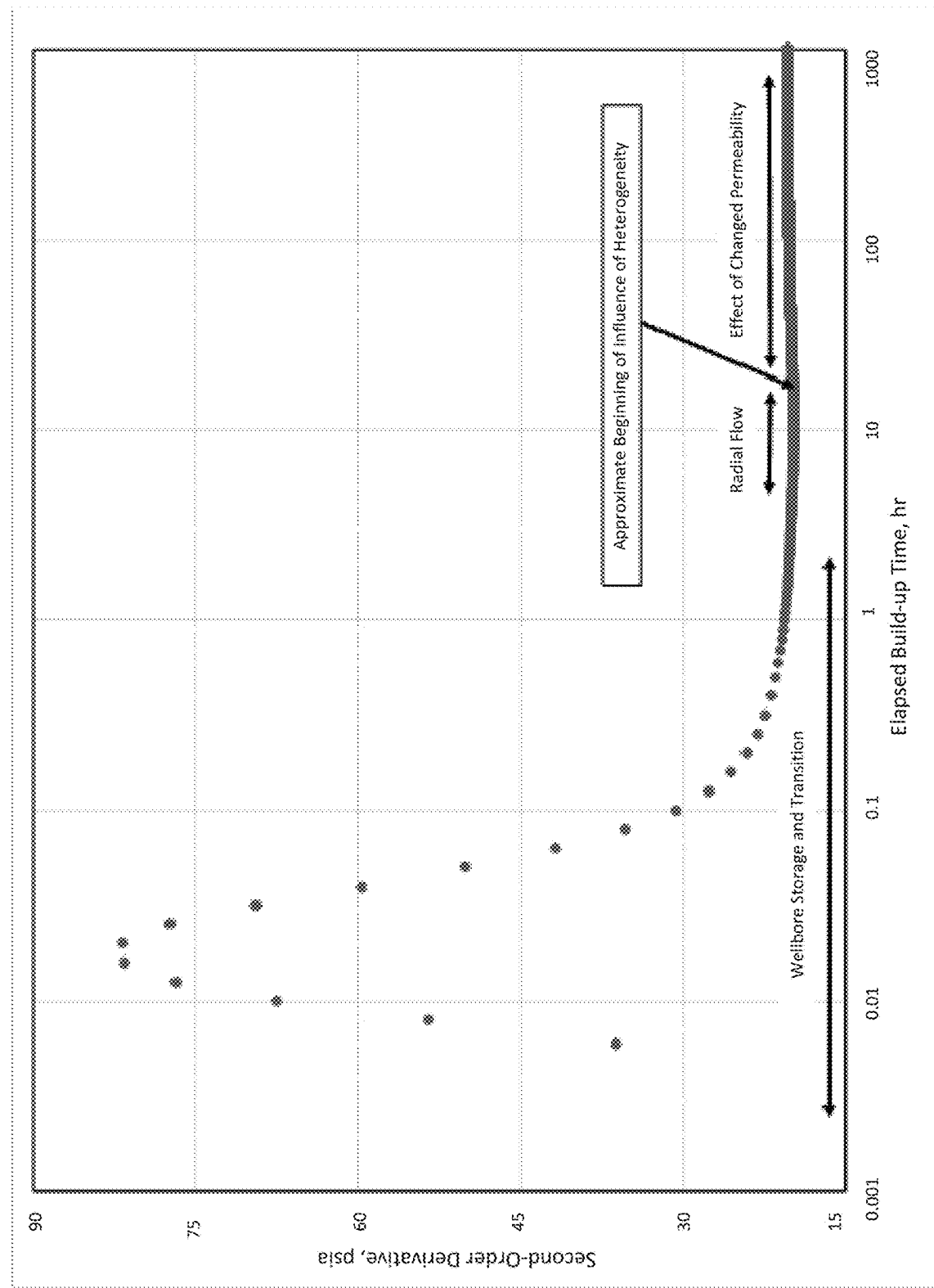
Figure 5:
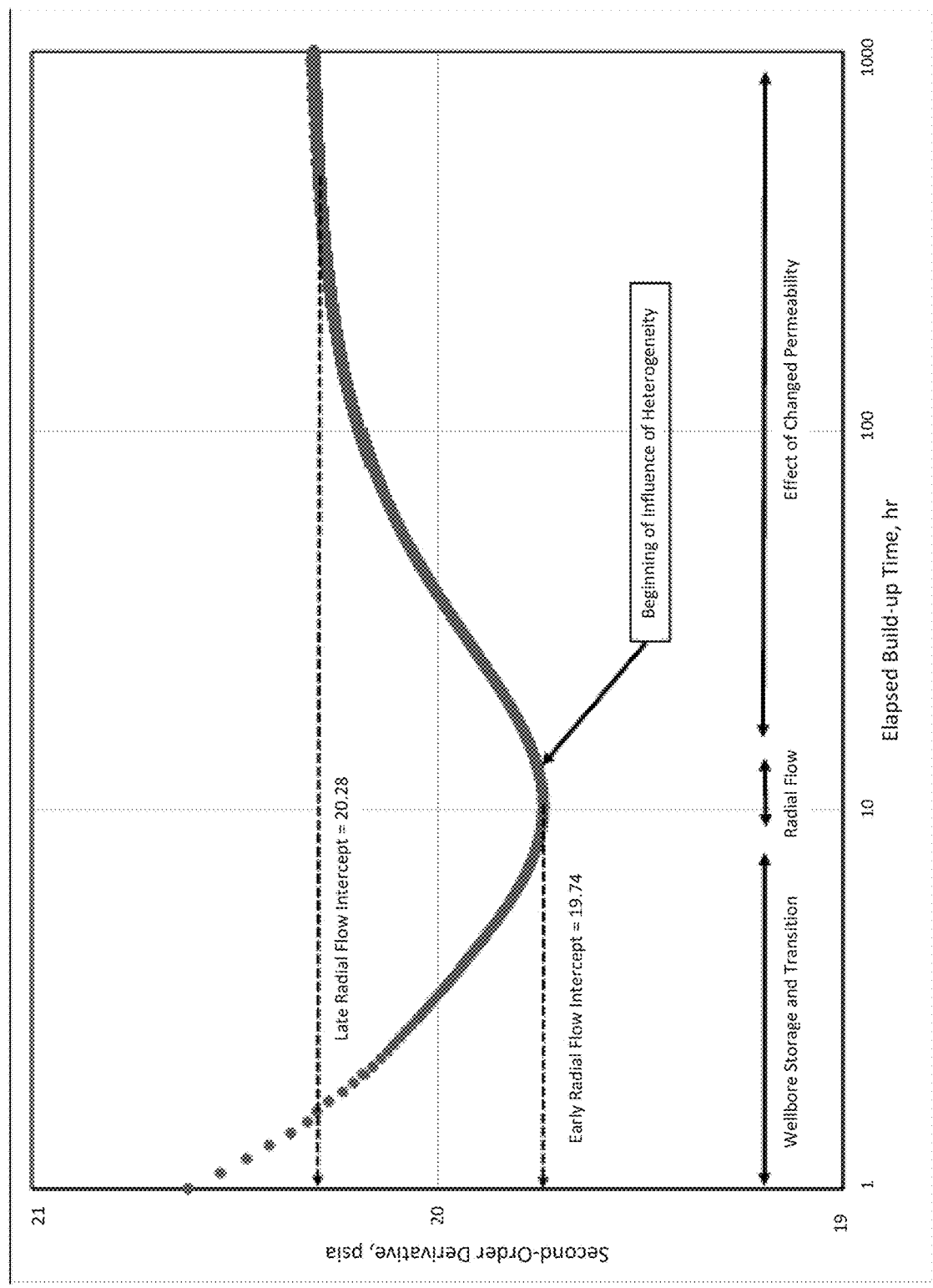

FIG. 2 is a flowchart that illustrates a method 200 of determining reservoir characteristics based on second order derivatives (SODs) of well pressure transient test data (and developing a hydrocarbon reservoir based on the reservoir characteristics determined) in accordance with one or more embodiments. In the context of the well 106, the operations of method 200 may be performed, for example, by the well control system 122 or another operator of the well 106. A processing module of the well control system 122 may perform one or more of the data processing operations described, such as those directed to collecting pressure data 150, determining SOD values for the pressure data 150, and determining associated reservoir characteristics 152 of the reservoir 102. A well operator, such as a control module of the well control system 122 or well personnel, may develop the reservoir 102 based on the reservoir characteristics 152. For example, a control module of the well control system 122 (or well personnel) may determine well operating parameters based on the reservoir characteristics 152 and the control module of the well control system 122 (or well personnel) may develop the reservoir 102 by operating the well 106 (or other wells in the reservoir 102) in accordance with the well operating parameters.

In some embodiments, method 200 includes conducting a pressure transient test of a well in a reservoir to generate pressure transient test data (block 202). This may include, for example, conducting a well build-up (or well draw-down) type pressure transient test of a hydrocarbon well in a hydrocarbon reservoir to generate corresponding pressure transient test data for the well that includes measurements of bottomhole pressure across a given interval of time (or "time interval") of the well build-up (or well draw-down) test. For example, this may include the control system 122 (or another operator of the well 106) conducting a well build-up test that includes controlling the flow control valve system 126 to operate in an opened state to achieve a stabilized production flowrate from the wellbore 120, and, then, controlling the flow control valve system 126 to suddenly transition to a fully closed state to inhibit the flow of production from the wellbore 120 (or "shut-in" the well 106) and acquiring a sequence of time series downhole pressure measurements (e.g., by way of the downhole pressure sensor 124) for a 1,000 hour interval of time immediately following the closing of the flow control valve system 126. In some embodiments, each of the sequence of time series downhole pressure measurements (p) is associated with a corresponding flowrate measurement (q). The corresponding flowrate measurement (q) may be a measured production flowrate for the well 106 (e.g., measured by the production flowrate sensor 128) at or near the time (t) of the pressure measurement (p). In such an embodiment, the pressure data 150 may include the following pressure data points $(p_0, q_0, t_0), (p_1, q_1, t_1), (p_2, q_0, t_2), \ldots, (p_{n-1}, q_{n-1}, t_{n-1})$, and $(p_n, q_n, t_n)$. In some embodiments, the downhole pressure measurements $(p_0, p_1, p_2, \ldots, p_{n-1}, p_n)$ may be acquired at a sampling frequency of one data point per second. Continuing with the prior example of a 1,000 hour interval of time, in such an embodiment the sequence of time series downhole pressure measurements may include a series of U.S. Pat. No. 3,600,000 "time-stamped" pressure measurements and corresponding pressure data points. A first of the pressure measurements may, for example, be "stamped" (or otherwise associated with) a start time ($t_0$) that corresponds to the time of closing of the flow control valve system 126. A similar approach may be undertaken for a well draw-down type pressure transient test. In such an embodiment, a first of the pressure measurements may, for example, be "stamped" (or otherwise associated with) a start time ($t_0$) that corresponds to the time of further opening of the flow control valve system 126.

In some embodiments, the method 200 includes determining superposition times for the well pressure transient test data (block 204). This may include, for example, conducting, for the measurements of bottomhole pressure of the pressure transient test data for the well, a time function superposition that includes constructing and applying a superposition time function to generate superposition times for the measurements of bottomhole pressure across the given interval of time. In some embodiments, the time function superposition includes constructing the following superposition time function $T(\Delta t)$ for prior changes in flowrates and applying it to each of the measurements of bottomhole pressure to generate a superposition time ($T_i$) for each of the measurements of bottomhole pressure across the given interval of time:

$$T(\Delta t) = \frac{\sum_{l=1}^{n-1}(q_l - q_{l-1})\ln\left(\sum_{j=1}^{n-1} \Delta t_j + \Delta t\right)}{q_n - q_{n-1}} + \ln(\Delta t) \quad (2)$$

where:

$\Delta t$ is an elapsed time since the last flowrate change of the hydrocarbon well (e.g., defined as a duration of time from the start of a test to produce the current running flowrate, such as the start of the shut-in of a build-up test or the change in production state of a draw-down test that produces up to the current (n+1)th flowrate in the well's history, to a current time) (e.g., in units of hours);

n is a number of the changes in flowrates since the well has been subject to its first production or injection to the current elapsed time, which is at $\Delta t$ since the last rate change (e.g., if a well has been operated at only a first flowrate and a second flowrate prior to the current build-up period, then there have been two flowrate changes and, thus, n=2 with three flow rates in the history; the current build-up period may be counted as the third flowrate with a magnitude of zero in the well's history, and, therefore, counting of $\Delta t$ falls under the third flowrate, beginning at the end of the second flowrate).

$q_l$ is the lth rate of production at respective period in time sequence in standard conditions from the wellbore of the well among (n+1) rates in the history including the rate of production at a current time defined by the elapsed time, $\Delta t$, since the last rate change of the corresponding pressure measurement, in units of barrels per day (STB/d) (e.g., in the case of a build-up test, $q_l$ is zero during the shut-in). Similarly $q_n$ is the nth rate in the history. Notably, the flowrate at each measured point in time and pressure are known a priori. Changes in flowrates may be accounted for by the superposition time function in Equation 2.

Continuing with the prior example, determining superposition times for the pressure transient test data may include the control system 122 applying the superposition time function $T(\Delta t)$ of Equation 2 to each of the 3,600,000 pressure data points at 3,600,000 values of $\Delta t$ corresponding to the measurements of bottomhole pressure to generate a corresponding superposition time ($T_i$) for each data point. In such an example, all of the data points (i=1 to 3,600,000) belong to the same flowrate following n changes in flowrates in the well's history.

In some embodiments, the method 200 includes determining first order derivative (FOD) values for the pressure transient test data (block 206). This may include, for example, determining, based on the superposition times and corresponding measurements of bottomhole pressure across the given interval of time, first order derivative (FOD) values for the measurements of bottomhole pressure across the given interval of time. In some embodiments, determining the FOD values for the measurements of bottomhole pressure across the given interval of time includes applying of the following first order equation ($FOD_1$) to the each of the measurements of bottomhole pressure across the given interval of time to generate a corresponding FOD value for each of the measurements of bottomhole pressure across the given interval of time:

$$FOD_i = \left(\frac{\partial p}{\partial T}\right)_i = \frac{\left(\frac{\Delta p_1}{\Delta T_1}\right)\Delta T_2 + \left(\frac{\Delta p_2}{\Delta T_2}\right)\Delta T_1}{\Delta T_1 + \Delta T_2} \quad (3)$$

where:

$\Delta p_1$ is a difference between a pressure associated with the measurement (i) and a pressure associated with the preceding measurement (i−1), ΔT₁ is a difference between a superposition time associated with the measurement (i) and a superposition time associated with a preceding measurement (i−1), Δp₂ is a difference between the pressure associated with the measurement (i) and a pressure associated with a subsequent measurement (i+1), and ΔT₂ is a difference between the superposition time associated with the measurement (i) and a superposition time associated with the subsequent measurement (i+1);

Continuing with the prior example, determining FOD values for the pressure transient test data may include the control system 122 applying the first order equation (FOD₁) of Equation 3 to each of the 3,600,000 pressure data points corresponding to the measurements of bottomhole pressure to generate a corresponding FOD value for each of the measurements of bottomhole pressure across the given interval of time. The FOD value for a measurement of bottomhole pressure may be associated with the superposition time ($T_i$) corresponding to the measurements of bottomhole pressure. T is indexed as $T_i$ due to its reference to a measured pressure.

In some embodiments, the method 200 includes determining second order derivative (SOD) values for the pressure transient test data (block 208). This may include, for example, determining, based on the superposition times and corresponding FOD values for the measurements of bottomhole pressure across the given interval of time, second order derivative (SOD) values for the measurements of bottomhole pressure across the given interval of time. In some embodiments, the determining of the SOD values for the measurements of bottomhole pressure across the given interval of time includes applying of the following second order equation ($SOD_i$) to each of the FOD values for the measurements of bottomhole pressure across the given interval of time to generate a SOD value for each of the measurements of bottomhole pressure across the given interval of time:

$$SOD_i = \left(\frac{\partial FOD}{\partial T}\right)_i - FOD_i \quad (4)$$

where $$\left(\frac{\partial FOD}{\partial T}\right)_i = \frac{\left(\frac{\Delta FOD_1}{\Delta T_1}\right)\Delta T_2 + \left(\frac{\Delta FOD_2}{\Delta T_2}\right)\Delta T_1}{\Delta T_1 + \Delta T_2} \quad (5)$$

and where

ΔFOD₁ is a difference between a FOD associated with the measurement (i) and a FOD associated with a preceding measurement (i−1), ΔT₁ is a difference between a superposition time associated with the measurement (i) and a superposition time associated with a preceding measurement (i−1), ΔFOD₂ is a difference between the FOD associated with the measurement (i) and a FOD associated with a subsequent measurement (i+1), and ΔT₂ is a difference between the superposition time associated with the measurement (i) and a superposition time associated with the subsequent measurement (i+1).

Continuing with the prior example, determining SOD values for the pressure transient test data may include the control system 122 applying the second order equation ($SOD_i$) of Equation 3 to each of the 3,600,000 FOD values corresponding to the measurements of bottomhole pressure across the given interval of time to generate a corresponding SOD value for each of the measurements of bottomhole pressure across the given interval of time. The SOD value for a measurement of bottomhole pressure may be associated with the superposition time ($T_i$) corresponding to the measurements of bottomhole pressure. In some embodiments, the SOD value is plotted on a semi-log or log-log plot of the SOD values of pressure versus time that is displayed or otherwise presented, for example, to a well operator for visual inspection. This may provide a visual depiction of the pressure response, which can be further assessed to determine reservoir characteristics for the well 106. Examples of semi-log and log-log plots of SOD values and corresponding utilizations are discussed in more details with regard to at least FIGS. 3-10.

In some embodiments, the method 200 includes determining reservoir characteristics based on the SOD values for the pressure transient test data (block 210). This may include, for example, determining permeability, flow capacity or flow restricting damage to the reservoir based on an assessment of the SOD values for the pressure transient test data. Continuing with the prior example, determining reservoir characteristics based on the SOD values for the pressure transient test data may include determining a permeability value (k) for each of one or more regions of the reservoir 102 based on a semi-log or log-log plot of the SOD values of pressure versus elapsed time (see, e.g., FIGS. 4, 5, 7, 9 and 10).

In some embodiments, the method 200 includes developing a reservoir based on the reservoir characteristics (block 212). This may include developing the reservoir 102 based on the reservoir characteristics determined based on the SOD values for the pressure transient test data. Continuing with the prior example, this may include developing the reservoir 102 based on a permeability value (k) for each of one or more regions of the reservoir 102 based on a semi-log or log-log plot of the SOD values of pressure versus elapsed time, Δt. Calculations of FOD and SOD may employ superposition time (T) with the results displayed as FOD or SOD versus elapsed time, Δt (see, e.g., FIGS. 4, 5, 7, 9 and 10). In some embodiments, developing a reservoir includes undertaking operations, such as plugging back the well, re-perforating the well, controlling well production rates or pressures, controlling well injection rates or pressures, determining injection fluid type, controlling well drilling operations, and so forth. Continuing with the prior example, operating parameters for the well 106 (or other wells in the reservoir 102), such as production rates or pressures (or injection rates or pressures), may be determined based on the permeability value (k) for each of one or more regions of the reservoir 102 (or other reservoir characteristics determined based on the SOD values), and the well 106 (or other wells in the reservoir 102) may be controlled to operate according to the parameters. For example, the well 106 may be operated to produce hydrocarbons from the reservoir 102 at a production rate or pressure determined based on the reservoir characteristics 152 determined based on the SOD values for the pressure transient test data 150 for the well 106.

The following describes example utilizations of the techniques described herein, including utilizing the workflow for computing the SOD for a set of time-pressure data. For the purpose of illustration, one example considers is a two-region, radial, composite reservoir system of a circular inner region, surrounded by a region of infinite extent (see, e.g., FIG. 3, which illustrates a schematic of an example two-zone, radial, composite reservoir system, in accordance with one or more embodiments). The producing well is located at the center of the system, O, and there is a 3% lower permeability in the outer region of infinite extent than in the inner region of radius, R=1,060 feet (ft). The SOD profile of this case may be presented on a semi-log or log-log plot (see, e.g., FIG. 4, which illustrates an example manifestation of lateral increase in permeability with SOD on a semi-log plot, in accordance with one or more embodiments), which may not clearly manifests the features due to the 3% permeability change. The ambiguity in this particular case may be due to the dominance of the vertical scale of the SOD by the wellbore storage phenomenon. A zoomed-in view of this presentation (see, e.g., FIG. 5, which illustrates an example manifestation of lateral increase in permeability with SOD in zoomed-in view on a semi-log plot, in accordance with one or more embodiments) illustrates how the subtle change in permeability provides for readily detectable differences in the values of the SOD profile with time on a semi-log plot. For example, the contrast in the intercept values (e.g., the ratio of the intercepts=20.28/19.74≈1.03) may be directly influenced by the 3% permeability contrast between the inner and the outer regions.

Modeling Heterogeneity

The following describes example techniques for modeling heterogeneity, including a discussion of the modeling aspect of reservoir heterogeneity with the presentation of SOD. Analytical solutions for wellbore pressures are normally presented in either real-time or Laplace domain. The expressions for SOD are presented in both of these ways in the following two subsections to illustrate an example modeling procedure.

i. Closed-Form Solution in Time Domain

Figure 6:
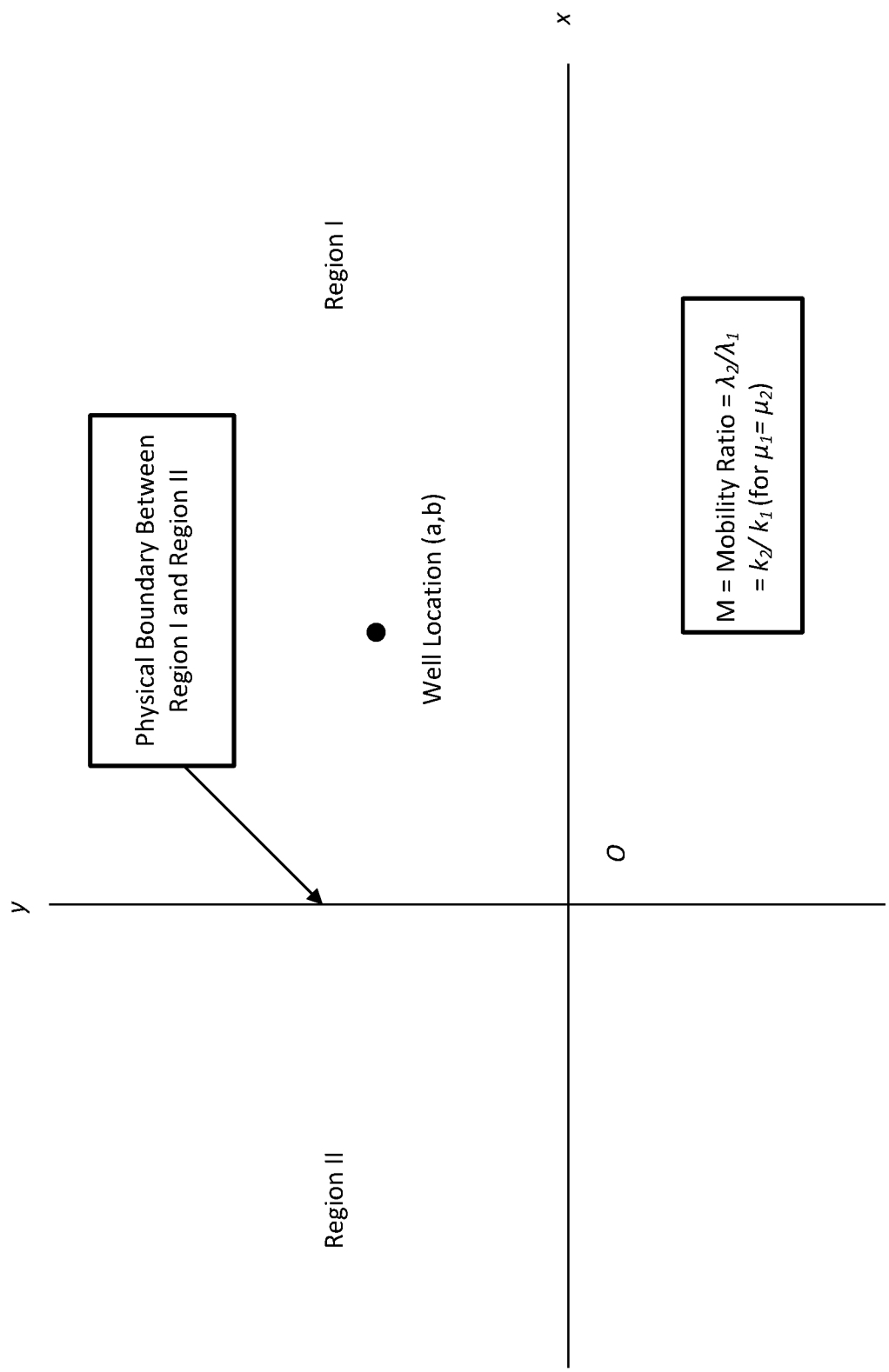

The following examines a case of lateral heterogeneity in the reservoir system as presented in FIG. 6 (an illustration of lateral variation of permeability between Region I and Region II in terms of mobility ratio, M, in accordance with one or more embodiments). The closed-form solution for pressure drawdown anywhere in the reservoir system (see, e.g., the description of Bixel, H. C., Larkin, B. K., and van Poollen, H. K.: "Effect of Linear Discontinuities on Pressure Build-Up and Drawdown Behavior," Journal of Petroleum Technology, volume 15, issue 8, August 1963, pages 885-895, which is incorporated by reference) may be utilized in this numerical experiment. In this system, the well is located at coordinates (a, b) in Region I. Region I is located on the right-hand side of the y-axis, and Region II is located on the left-hand side of the y-axis. Although the y-axis physically separates Region I from Region II, it may allow for complete hydraulic communication between the two regions. Region I and Region II may have distinct magnitudes of permeability, with Regions I and II having respective permeabilities of $k_1$ and $k_2$.

To assess the effects of reservoir heterogeneity at the producing well located in Region I, Region II is considered to have different permeability from that in Region I in FIG. 6. Here the boundary of x=0 acts as an interface between Regions I and II. To perform numerical experiments, designating t as the elapsed time in hours since the production has begun, the analytical solution of Bixel et al. (1963) can be utilized, as follows:

$$\Delta p = p_i - p(x, y) = -\frac{70.6qB\mu_1}{k_1 h}\left[Ei\left(-\frac{r^2}{4\eta t}\right) + \frac{1-M}{1+M}Ei\left(-\frac{r_i^2}{4\eta t}\right)\right] \quad (6)$$

where $$M = \lambda_2/\lambda_1 \quad (7)$$

$$r^2 = (x-a)^2 + (y-b)^2 \quad (8)$$

$$r_i^2 = (x+a)^2 + (y-b)^2 \quad (9)$$

$$\lambda_1 = k_1/\mu_1 \quad (10)$$

$$\lambda_2 = k_2/\mu_2 \quad (11)$$

$$\eta = \frac{0.0002637 k_1}{\phi_1 \mu_1 c_{t1}} = \frac{0.0002637 k_2}{\phi_2 \mu_2 c_{t2}} \quad (12)$$

A well-test derivative or FOD may be derived from Equation 6 as follows:

$$-t\frac{\partial p}{\partial t} = \frac{70.6qB\mu_1}{k_1 h}\left[\exp\left(-\frac{r^2}{4\eta t}\right) + \frac{1-M}{1+M}\exp\left(-\frac{r_i^2}{4\eta t}\right)\right] \quad (13)$$

The SOD may be derived from Equation 6 as follows:

$$t^2\frac{\partial^2 p}{\partial t^2} = \quad (14)$$

$$\frac{70.6qB\mu_1}{k_1 h}\left[\left(1 - \frac{r^2}{4\eta t}\right)\exp\left(-\frac{r^2}{4\eta t}\right) + \frac{1-M}{1+M}\left(1 - \frac{r_i^2}{4\eta t}\right)\exp\left(-\frac{r_i^2}{4\eta t}\right)\right]$$

Figure 7:
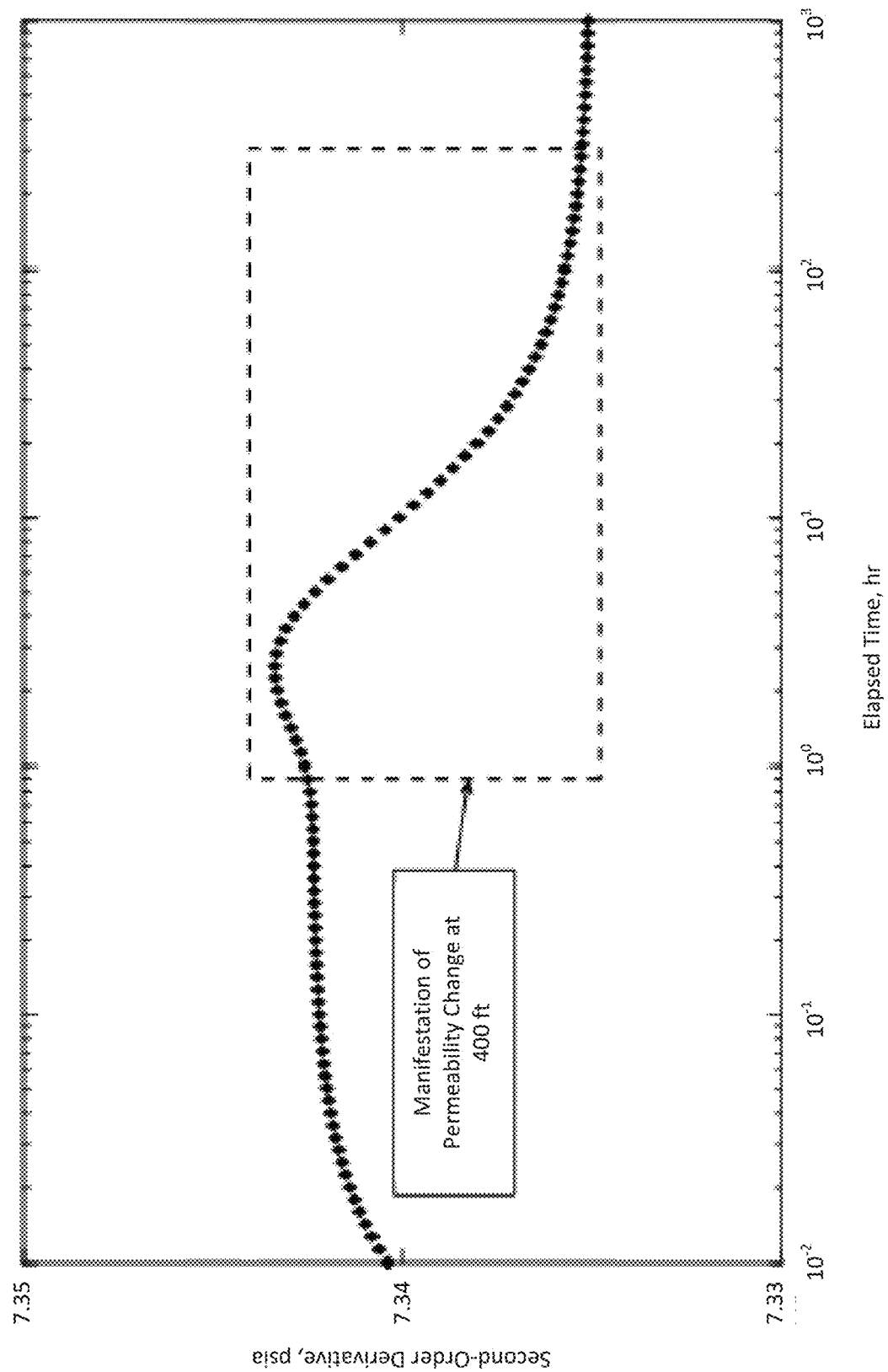

Equation 14 can be utilized to generate the SOD profile in FIG. 7 for the laterally-heterogeneous system of FIG. 6 (which illustrates manifestation of lateral increase in permeability with SOD on a semi-log plot, in accordance with one or more embodiments). In such a case, the lateral permeability may be considered to have changed by 0.2% (M=1.002) at a lateral distance of 400 feet from the producing well. FIG. 7 illustrates a SOD profile during a constant-rate production with elapsed time on a semi-log plot, which presents the high-resolution manifestation of the reservoir heterogeneity. Displaying the effects of such a subtle change in permeability in the mathematical models with prior/existing techniques may be improbable.

ii. Closed-Form Solution in Laplace Domain

Described is a procedure for computing the SOD when the analytical solutions to wellbore flowing pressures, $\bar{p}_{wf}$, are available closed form in the Laplace domain. The first-order derivative may be calculated, for example, as described in Rahman, N. M. A. and Bin Akresh, S. A.: "Profiling Pressure-Derivative Values—A New, Innovative Way to Estimate the Radii of Investigation in Heterogeneous Reservoir Systems," paper SPE 164217 presented at the SPE Middle East Oil and Gas Show and Exhibition, Manama, Bahrain, 10-13 Mar. 2013, which is incorporated by reference). A similar procedure may be used to compute the SOD as follows:

$$t^2\frac{\partial^2 p_{wf}}{\partial t^2} = t^2 L^{-1}\left\{L\left(\frac{\partial^2 p_{wf}}{\partial t^2}\right)\right\} = t^2 L^{-1}\{S^2 \bar{p}_{wf} - Sp_i - p'_{wf}(t=0)\} \quad (15)$$

Notably, the third term on the right-hand side of Equation 15, $p_{wf}'(t=0)$, may not be available in closed form. Thus, this term may need to be computed approximately as the very early time pressure responses. Here t is the elapsed time since the beginning of the production or injection in the well. The reservoir intersected by the well may have been maintained at a uniform, static pressure of $p_i$ up until t=0 (also known as the initial condition). As the well starts production right after t=0, the corresponding value of $p_{wf}'(t=0)$ may be found not significantly influential in the calculation of the SOD with Equation 15, especially at the early time. Accordingly, there are situations when the term, $p_{wf}'(t=0)$, on the right-hand side of Equation 15 can be ignored for the purpose of computing the SOD.

Figure 8:
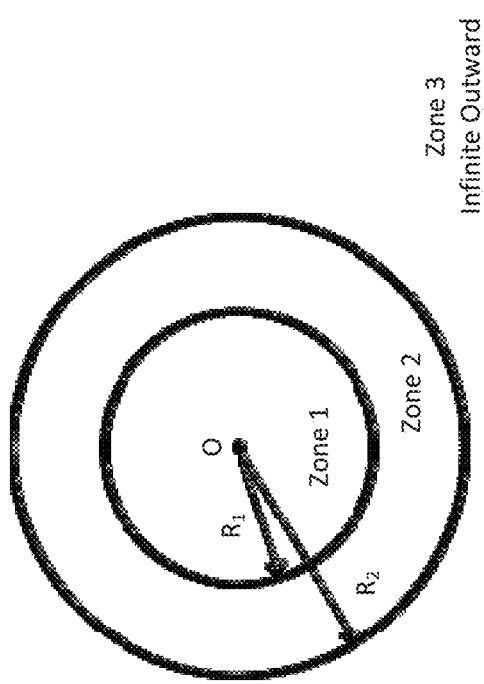

Next, considered is a three-region, radial, composite reservoir system (see, e.g., FIG. 8, which illustrates a schematic of a three-zone, radial, composite reservoir system, in accordance with one or more embodiments). Here the producing well is located at the center, 0, of Zone 1, the innermost zone in the system. Zone 1 is surrounded by a concentric zone, Zone 2, and also Zone 3 of infinite extent. These three zones may have distinct rock and fluid properties, including the permeability values.

Figure 9:
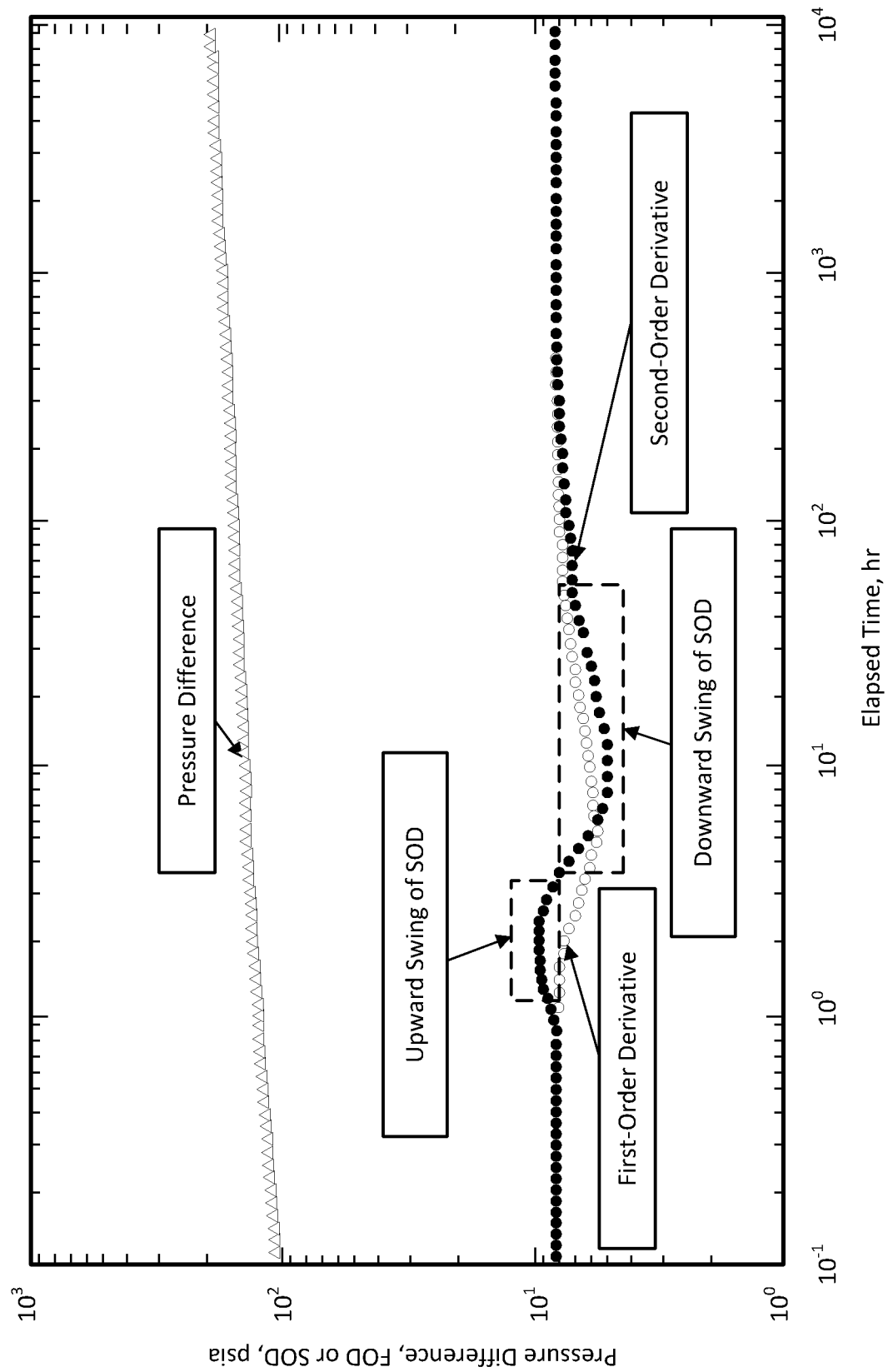
Figure 10:
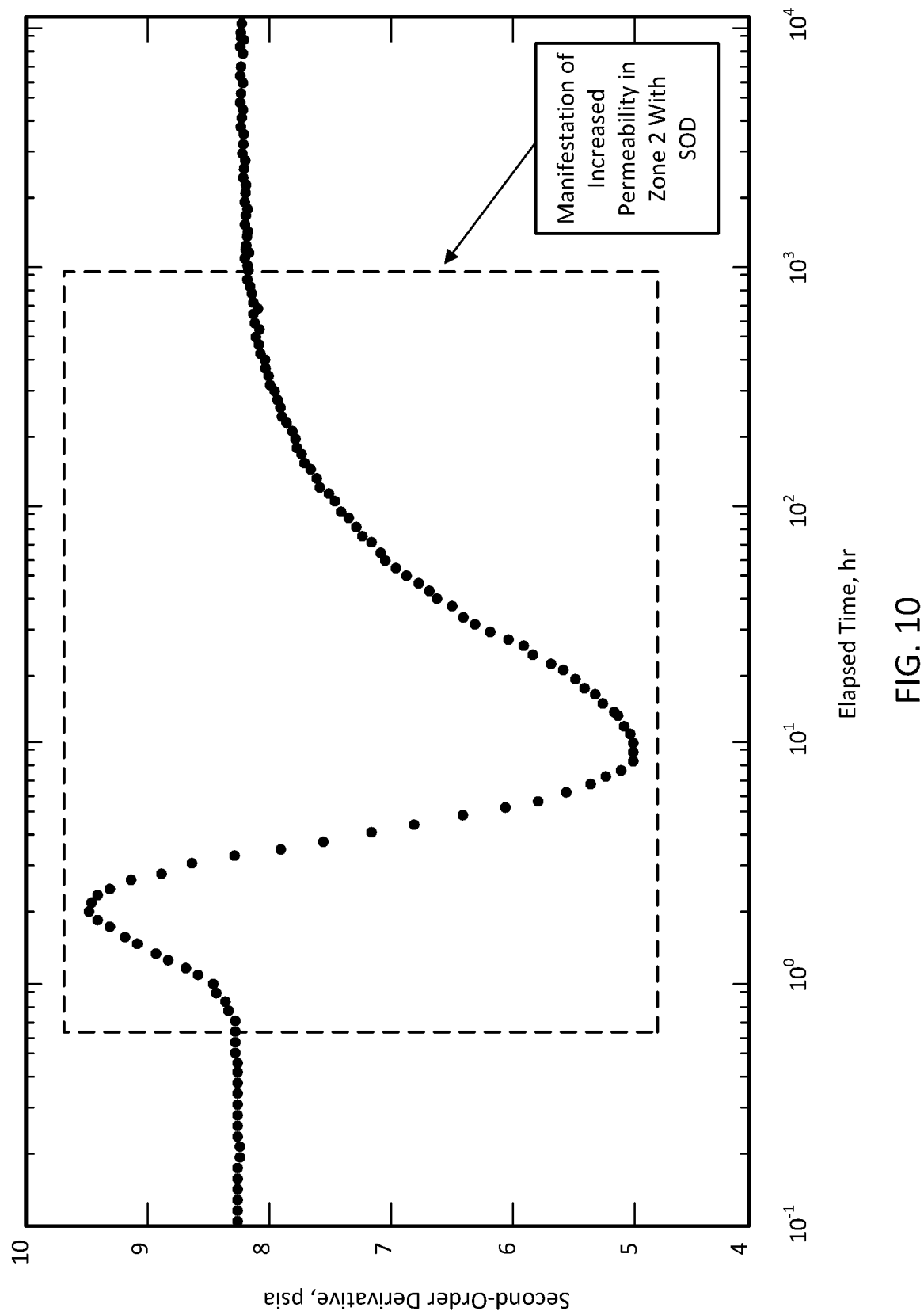

Utilizing the analytical solution to the wellbore flowing pressure in the Laplace domain (e.g., as presented by Rahman and Bin Akresh (2013)) may provide for generation of the pressure differences, the FOD and the SOD with the elapsed time of production presented in FIG. 9 (which provides a comparison of the responses of FOD and SOD on a log-log plot, in accordance with one or more embodiments). Equation 15 may be utilized to compute the SOD profile by employing the Stehfest algorithm (e.g., as described at Stehfest, H.: "Algorithm 368: Numerical Inversion of Laplace Transforms," Communications of ACM, volume 13, issue 1, 1970, pages 47-49 (1970)) for inversion of the solution in the Laplace domain to that in the corresponding real-time domain, which is incorporated by reference). The comparison of FIG. 9 shows the presentation with SOD manifests additional features with upward and downward swings, while a traditional FOD causes only one downward swing due the increased permeability in Zone 2 (over $R_1$=700 to $R_2$=1,200 ft) in the radial, composite reservoir system. That is, the FOD profile deflects in only one direction in response to a permeability change. Notably, the amplitudes of deflections of the SOD profiles supersede those of the corresponding FOD profiles to register the permeability change. Hence, it may be easier to diagnose reservoir heterogeneity with the SOD profile than with the corresponding FOD profile. As shown in FIG. 10 (which illustrates manifestation of increased permeability in Zone 2 with SOD on a semi-log plot in accordance with one or more embodiments), plotting of the SOD profile on a semi-log plane makes the features due to the increased permeability in Zone 2 far more recognizable readily than any comparable methods of the prior art.

The preceding examples demonstrate that the SOD may provide a desirable magnification of the pressure responses due to minor changes in permeability in the reservoir. This may enable the permeability changes to be readily recognized. The FOD may not be very sensitive to minor changes in permeability in the reservoir, and, therefore, the FOD may not be suitable for studying high-resolution heterogeneity. The responses of the SOD described are far more drastic than those of the traditional FOD.

| Nomenclature: | |
|---|---|
| $B_o$ | Formation volume factor of fluid in both Regions I and II, bbl/STB |
| $c_{t1}$, $c_{t2}$ | Total system compressibility in Region I and Region II, respectively, 1/psia |
| Ei(-z) | Exponential integral function of z |
| FOD | First-order derivative (or "well test" derivative), defined as $^{+\pi_p}/_{+\pi_t}$, psia |
| h | Pay thickness of both Regions I and II, ft |
| i | $i^{th}$ place in a time sequence when pressure is measured |
| $k_1$, $k_2$ | Permeability in Region I and Region II, respectively, md |
| l | $i^{th}$ period to account for corresponding rate and time period in superposition in Equation 2 |
| L | Laplace transform of a time-dependent function (e.g., of $p_{wf}$) |
| $L^{-1}$ | Inverse Laplace transform of an already transformed function |
| M | Mobility ratio |
| n | Total number of flowrate changes in well's history (e.g., a total number of changes of flowrates of the well since the well has been subject to its first production or injection to a current time of the elapsed time, $\Delta t$) |
| $p_i$ | Initial reservoir pressure (static reservoir pressure at $\Delta t$ = 0), psia |
| $p_{wf}$ | Wellbore flowing pressure, psia |
| $p_{wf}'(\Delta t = 0)$ | Pressure derivative with respect to time at wellbore, psia |
| $\bar{p}_{wf}$ | Wellbore flowing pressure in Laplace domain (Laplace transformed), psia-hr |
| q | Rate of production in standard conditions from wellbore, STB/d |
| r | Radial distance in the reservoir from center of well, ft |
| $r_w$ | Actual wellbore radius, ft |
| S | Laplace transform parameter, hr$^{-1}$ |
| SOD | Second-order derivative, psia |
| t | Elapsed time since the beginning of production, hr |
| $\Delta t$ | Elapsed time of the current flow rate since the last flowrate change has occurred (e.g., defined a duration of time from the start of a test to produce the current running flowrate, such as the start of the shut-in of a build-up test or the change in production states of a draw-down test that produces the current flowrate, to a current time), hr |
| T($\Delta t$) | Superposition time function as a function of elapsed time, without unit |
| x, y | Coordinates of a point of interest, ft |
| a, b | Coordinates of well location, ft |
| $\phi_1$, $\phi_2$ | Porosity in Region I and Region II, respectively, fraction |
| $\lambda_1$, $\lambda_2$ | Mobility in Region I and Region II, respectively, md/cp |
| $\mu_1$, $\mu_2$ | Viscosity in Region I and Region II, respectively, cp |

Figure 11:
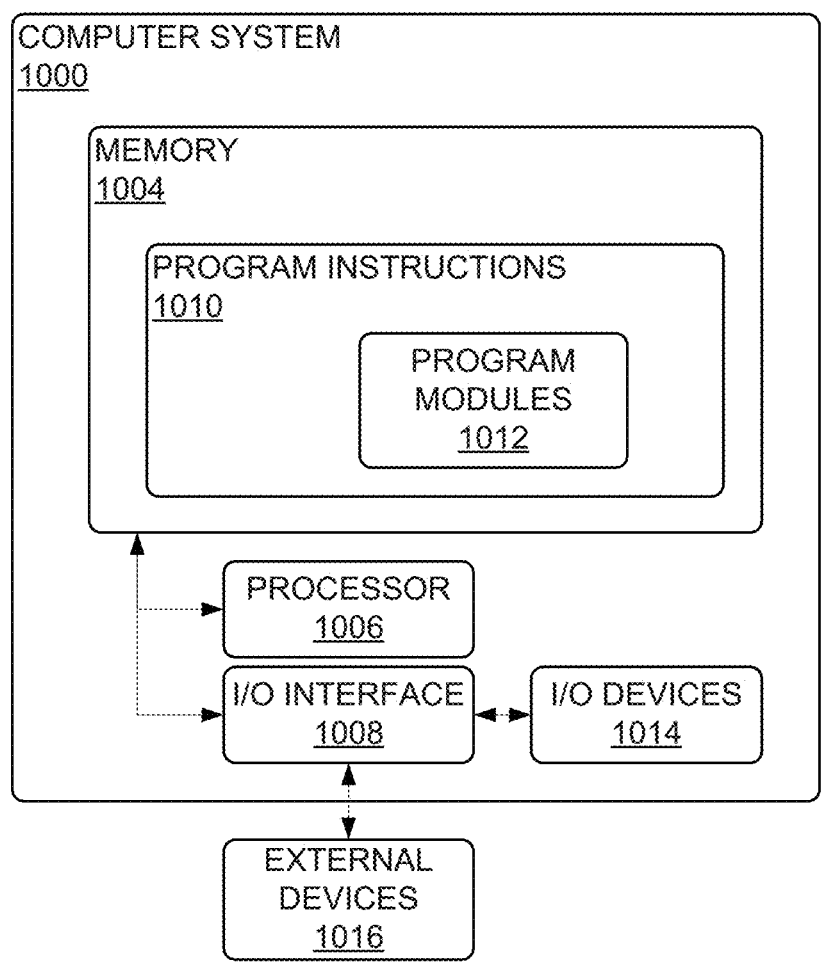
FIG. 11 is a diagram that illustrates an example computer system in accordance with one or more embodiments.

FIG. 11 is a diagram that illustrates an example computer system (or "system") 1000 in accordance with one or more embodiments. In some embodiments, the system 1000 is a programmable logic controller (PLC). The system 1000 may include a memory 1004, a processor 1006 and an input/output (I/O) interface 1008. The memory 1004 may include non-volatile memory (e.g., flash memory, read-only memory (ROM), programmable read-only memory (PROM), erasable programmable read-only memory (EPROM), electrically erasable programmable read-only memory (EEPROM)), volatile memory (e.g., random access memory (RAM), static random access memory (SRAM), synchronous dynamic RAM (SDRAM)), or bulk storage memory (e.g., CD-ROM or DVD-ROM, hard drives). The memory 1004 may include a non-transitory computer-readable storage medium having program instructions 1010 stored thereon. The program instructions 1010 may include program modules 1012 that are executable by a computer processor (e.g., the processor 1006) to cause the functional operations described, such as those described with regard to the well control system 122 or the method 200.

The processor 1006 may be any suitable processor capable of executing program instructions. The processor 1006 may include a central processing unit (CPU) that carries out program instructions (e.g., the program instructions of the program modules 1012) to perform the arithmetical, logical, or input/output operations described. The processor 1006 may include one or more processors. The I/O interface 1008 may provide an interface for communication with one or more I/O devices 1014, such as a joystick, a computer mouse, a keyboard, or a display screen (for example, an electronic display for displaying a graphical user interface (GUI)). The I/O devices 1014 may include one or more of the user input devices. The I/O devices 1014 may be connected to the I/O interface 1008 by way of a wired connection (e.g., an Industrial Ethernet connection) or a wireless connection (e.g., a Wi-Fi connection). The I/O interface 1008 may provide an interface for communication with one or more external devices 1016. In some embodiments, the I/O interface 1008 includes one or both of an antenna and a transceiver. In some embodiments, the external devices 1016 include logging tools, lab test systems, well pressure sensors, or well flowrate sensors.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments. It is to be understood that the forms of the embodiments shown and described herein are to be taken as examples of embodiments. Elements and materials may be substituted for those illustrated and described herein, parts and processes may be reversed or omitted, and certain features of the embodiments may be utilized independently, all as would be apparent to one skilled in the art after having the benefit of this description of the embodiments. Changes may be made in the elements described herein without departing from the spirit and scope of the embodiments as described in the following claims. Headings used herein are for organizational purposes only and are not meant to be used to limit the scope of the description.

It will be appreciated that the processes and methods described herein are example embodiments of processes and methods that may be employed in accordance with the techniques described herein. The processes and methods may be modified to facilitate variations of their implementation and use. The order of the processes and methods and the operations provided may be changed, and various elements may be added, reordered, combined, omitted, modified, and so forth. Portions of the processes and methods may be implemented in software, hardware, or a combination of software and hardware. Some or all of the portions of the processes and methods may be implemented by one or more of the processors/modules/applications described here.

As used throughout this application, the word "may" is used in a permissive sense (i.e., meaning having the potential to), rather than the mandatory sense (i.e., meaning must). The words "include," "including," and "includes" mean including, but not limited to. As used throughout this application, the singular forms "a", "an," and "the" include plural referents unless the content clearly indicates otherwise. Thus, for example, reference to "an element" may include a combination of two or more elements. As used throughout this application, the term "or" is used in an inclusive sense, unless indicated otherwise. That is, a description of an element including A or B may refer to the element including one or both of A and B. As used throughout this application, the phrase "based on" does not limit the associated operation to being solely based on a particular item. Thus, for example, processing "based on" data A may include processing based at least in part on data A and based at least in part on data B, unless the content clearly indicates otherwise. As used throughout this application, the term "from" does not limit the associated operation to being directly from. Thus, for example, receiving an item "from" an entity may include receiving an item directly from the entity or indirectly from the entity (e.g., by way of an intermediary entity). Unless specifically stated otherwise, as apparent from the discussion, it is appreciated that throughout this specification discussions utilizing terms such as "processing," "computing," "calculating," "determining," or the like refer to actions or processes of a specific apparatus, such as a special purpose computer or a similar special purpose electronic processing/computing device. In the context of this specification, a special purpose computer or a similar special purpose electronic processing/computing device is capable of manipulating or transforming signals, typically represented as physical, electronic or magnetic quantities within memories, registers, or other information storage devices, transmission devices, or display devices of the special purpose computer or similar special purpose electronic processing/computing device.

What is claimed is:

1. A method of developing a hydrocarbon reservoir, the method comprising:
   conducting a build-up test of a hydrocarbon well having a wellbore extending into a hydrocarbon reservoir, the build-up test comprising:
      conducting a shut-in of the hydrocarbon well to inhibit production flow from the wellbore of the hydrocarbon well; and
      obtaining, by way of a downhole pressure sensor disposed in the wellbore of the hydrocarbon well, pressure transient test data that comprises a number (n) of pressure data points corresponding to measurements of bottomhole pressure across a given interval of time during the shut-in of the hydrocarbon well;
   conducting, for the pressure data points, a time function superposition that comprises application of a superposition time function to generate superposition times for the measurements of bottomhole pressure across the given interval of time, the application of the superposition time function comprising applying the following superposition time function $T(\Delta t)$ to each of the pressure data points to generate a superposition time $(T_i)$ for each of the measurements of bottomhole pressure across the given interval of time:

$$T(\Delta t) = \frac{\sum_{l=1}^{n-1}(q_l - q_{l-1})\ln\left(\sum_{j=1}^{n-1}\Delta t_j + \Delta t\right)}{q_n - q_{n-1}} + \ln(\Delta t)$$

wherein:
$\Delta t$ is an elapsed time since a last flow-rate change of the hydrocarbon well to a current time,
n is a number of changes in flowrate of the hydrocarbon well since the hydrocarbon well has been subject to its first production or injection to a current time of the elapsed time, $\Delta t$,
$q_l$ is the $l^{th}$ rate of production of the hydrocarbon well at respective points in time sequence in standard conditions from the wellbore of the hydrocarbon well, including the rate of production at a current time defined by the elapsed time, $\Delta t$, and
$q_n$ is the $n^{th}$ rate of production of the hydrocarbon well;
determining, based on the superposition times and corresponding measurements of bottomhole pressure across the given interval of time, first order derivative (FOD) values for the measurements of bottomhole pressure across the given interval of time, the determining of the FOD value for each of the measurements of bottomhole pressure across the given interval of time comprising applying of the following first order equation ($FOD_i$) to the each of the measurements of bottomhole pressure across the given interval of time to generate a FOD value for each of the measurements of bottomhole pressure across the given interval of time:

$$FOD_i = \left(\frac{\partial p}{\partial T}\right)_i = \frac{\left(\frac{\Delta p_1}{\Delta T_1}\right)\Delta T_2 + \left(\frac{\Delta p_2}{\Delta T_2}\right)\Delta T_1}{\Delta T_1 + \Delta T_2}$$

wherein:
$\Delta p_1$ is a difference between a pressure associated with the measurement (i) and a pressure associated with the preceding measurement (i−1),
$\Delta T_1$ is a difference between a superposition time associated with the measurement (i) and a superposition time associated with a preceding measurement (i−1),
$\Delta p_2$ is a difference between the pressure associated with the measurement (i) and a pressure associated with a subsequent measurement (i+1), and
$\Delta T_2$ is a difference between the superposition time associated with the measurement (i) and a superposition time associated with the subsequent measurement (i+1);
determining, based on the FOD values for the measurements of bottomhole pressure across the given interval of time, second order derivative (SOD) values for the measurements of bottomhole pressure across the given interval of time, the determining of the SOD values for the measurements of bottomhole pressure across the given interval of time comprising applying of the following second order equation ($SOD_i$) to each of the FOD values for the measurements of bottomhole pressure across the given interval of time to generate a SOD value for each of the measurements of bottomhole pressure across the given interval of time:

$$SOD_i = \left(\frac{\partial FOD}{\partial T}\right)_i - FOD_i$$

wherein, $$\left(\frac{\partial FOD}{\partial T}\right)_i = \frac{\left(\frac{\Delta FOD_1}{\Delta T_1}\right)\Delta T_2 + \left(\frac{\Delta FOD_2}{\Delta T_2}\right)\Delta T_1}{\Delta T_1 + \Delta T_2}$$

and wherein,
$\Delta FOD_1$ is a difference between a FOD associated with the measurement (i) and a FOD associated with a preceding measurement (i−1),
$\Delta T_1$ is a difference between a superposition time associated with the measurement (i) and a superposition time associated with a preceding measurement (i−1),
$\Delta FOD_2$ is a difference between the FOD associated with the measurement (i) and a FOD associated with a subsequent measurement (i+1), and
$\Delta T_2$ is a difference between the superposition time associated with the measurement (i) and a superposition time associated with the subsequent measurement (i+1); and
determining, based on the SOD values for the measurements of bottomhole pressure across the given interval of time, a reservoir characteristic for the hydrocarbon reservoir;
determining, based on the reservoir characteristic for the hydrocarbon reservoir, operating parameters for a well in the hydrocarbon reservoir; and
operating the well in accordance with the operating parameters.

2. The method of claim 1, further comprising generating a semi-log or log-log plot of the SOD values for the measurements of bottomhole pressure across the given interval of time.

3. The method of claim 1, wherein the reservoir characteristic for the hydrocarbon reservoir comprises a permeability of the hydrocarbon reservoir.

4. The method of claim 1, wherein the operating parameters for a well in the hydrocarbon reservoir comprise an operating well flowrate or operating well pressure.

5. A method of developing a hydrocarbon reservoir, the method comprising:
obtaining, by way of a downhole pressure sensor disposed in the wellbore of the hydrocarbon well, pressure transient test data that comprises a number (n) of prior changes in the flowrates corresponding to measurements of bottomhole pressure across a given interval of time during pressure transient testing of the hydrocarbon well;
conducting, for the pressure data points, a time function superposition that comprises application of a superposition time function to generate superposition times for the measurements of bottomhole pressure across the given interval of time, the application of the superposition time function comprising applying the following superposition time function $T(\Delta t)$ to each of the pressure data points to generate a superposition time $(T_i)$ for each of the measurements of bottomhole pressure across the given interval of time:

$$T(\Delta t) = \frac{\sum_{l=1}^{n-1}(q_l - q_{l-1})\ln\left(\sum_{j=l}^{n-1}\Delta t_j + \Delta t\right)}{q_n - q_{n-1}} + \ln(\Delta t)$$

wherein:
Δt is an elapsed time since a last flowrate change of the hydrocarbon well to a current time,
n is a number of changes in flowrate of the hydrocarbon well since the hydrocarbon well has been subject to its first production or injection to the current time of the elapsed time, Δt,
$q_l$ is the $l^{th}$ rate of production of the hydrocarbon well at respective points in time sequence in standard conditions from the wellbore of the hydrocarbon well, including the rate of production at current time defined by the elapsed time, Δt, and
$q_n$ is the $n^{th}$ rate of production of the hydrocarbon well;
determining, based on the superposition times and corresponding measurements of bottomhole pressure across the given interval of time, first order derivative (FOD) values for the measurements of bottomhole pressure across the given interval of time, the determining of the FOD value for each of the measurements of bottomhole pressure across the given interval of time comprising applying of the following first order equation ($FOD_i$) to the each of the measurements of bottomhole pressure across the given interval of time to generate a FOD value for each of the measurements of bottomhole pressure across the given interval of time:

$$FOD_i = \left(\frac{\partial p}{\partial T}\right)_i = \frac{\left(\frac{\Delta p_1}{\Delta T_1}\right)\Delta T_2 + \left(\frac{\Delta p_2}{\Delta T_2}\right)\Delta T_1}{\Delta T_1 + \Delta T_2}$$

wherein:
$\Delta p_1$ is a difference between a pressure associated with the measurement (i) and a pressure associated with the preceding measurement (i−1),
$\Delta T_1$ is a difference between a superposition time associated with the measurement (i) and a superposition time associated with a preceding measurement (i−1),
$\Delta p_t$ is a difference between the pressure associated with the measurement (i) and a pressure associated with a subsequent measurement (i+1), and
$\Delta T_2$ is a difference between the superposition time associated with the measurement (i) and a superposition time associated with the subsequent measurement (i+1);
determining, based on the FOD values for the measurements of bottomhole pressure across the given interval of time, second order derivative (SOD) values for the measurements of bottomhole pressure across the given interval of time, the determining of the SOD values for the measurements of bottomhole pressure across the given interval of time comprising applying of the following second order equation ($SOD_1$) to each of the FOD values for the measurements of bottomhole pressure across the given interval of time to generate a SOD value for each of the measurements of bottomhole pressure across the given interval of time:

$$SOD_i = \left(\frac{\partial FOD}{\partial T}\right)_i - FOD_i$$

wherein, $$\left(\frac{\partial FOD}{\partial T}\right)_i = \frac{\left(\frac{\Delta FOD_1}{\Delta T_1}\right)\Delta T_2 + \left(\frac{\Delta FOD_2}{\Delta T_2}\right)\Delta T_1}{\Delta T_1 + \Delta T_2}$$

and wherein,
$\Delta FOD_1$ is a difference between a FOD associated with the measurement (i) and a FOD associated with a preceding measurement (i−1),
$\Delta T_1$ is a difference between a superposition time associated with the measurement (i) and a superposition time associated with a preceding measurement (i−1),
$\Delta FOD_2$ is a difference between the FOD associated with the measurement (i) and a FOD associated with a subsequent measurement (i+1), and
$\Delta T_2$ is a difference between the superposition time associated with the measurement (i) and a superposition time associated with the subsequent measurement (i+1); and
generating a semi-log or log-log plot of the SOD values for the measurements of bottomhole pressure across the given interval of time.

6. The method of claim 5, further comprising conducting the pressure transient testing of the hydrocarbon well.

7. The method of claim 6, wherein the pressure transient testing of the hydrocarbon well comprises conducing a build-up test of the hydrocarbon well that comprises conducting a shut-in of the hydrocarbon well to inhibit production flow from the wellbore of the hydrocarbon well.

8. The method of claim 6, wherein the pressure transient testing of the hydrocarbon well comprises conducing a draw-down test of the hydrocarbon well that comprises opening the hydrocarbon well to increase production flow from the wellbore of the hydrocarbon well.

9. The method of claim 5, further comprising determining, based on the SOD values for the measurements of bottomhole pressure across the given interval of time, a reservoir characteristic for the hydrocarbon reservoir.

10. The method of claim 9, wherein the reservoir characteristic for the hydrocarbon reservoir comprises a permeability of the hydrocarbon reservoir.

11. The method of claim 9, further comprising:
determining, based on the reservoir characteristic for the hydrocarbon reservoir, operating parameters for a well in the hydrocarbon reservoir; and
operating the well in accordance with the operating parameters.

12. The method of claim 11, wherein the operating parameters for a well in the hydrocarbon reservoir comprise an operating well flowrate or operating well pressure.

13. A system for developing a hydrocarbon reservoir, the system comprising:
a processor; and
a non-transitory computer readable storage medium comprising program instructions stored thereon that are executable by the processor to perform the following operations:
obtaining, by way of a downhole pressure sensor disposed in the wellbore of the hydrocarbon well, pressure transient test data that comprises a number (n) of the prior changes in flowrates in the history corresponding to measurements of bottomhole pressure across a given interval of time during pressure transient testing of the hydrocarbon well;

conducting, for the pressure data points, a time function superposition that comprises application of a superposition time function to generate superposition times for the measurements of bottomhole pressure across the given interval of time, the application of the superposition time function comprising applying the following superposition time function $T(\Delta t)$ to each of the pressure data points to generate a superposition time ($T_i$) for each of the measurements of bottomhole pressure across the given interval of time:

$$T(\Delta t) = \frac{\sum_{l=1}^{n-1}(q_l - q_{l-1})\ln\left(\sum_{j=l}^{n-1}\Delta t_j + \Delta t\right)}{q_n - q_{n-1}} + \ln(\Delta t)$$

wherein:

$\Delta t$ is an elapsed time since a last flowrate change of the hydrocarbon well to a current time, n is a number of changes in flowrate of the hydrocarbon well since the hydrocarbon well has been subject to its first production or injection to the current time of the elapsed time, $\Delta t$, $q_l$ is the $l^{th}$ rate of production of the hydrocarbon well at respective points in time sequence in standard conditions from the wellbore of the hydrocarbon well, including the rate of production at current time defined by the elapsed time, $\Delta t$, and $q_n$ is the $n^{th}$ rate of production of the hydrocarbon well;

determining, based on the superposition times and corresponding measurements of bottomhole pressure across the given interval of time, first order derivative (FOD) values for the measurements of bottomhole pressure across the given interval of time, the determining of the FOD value for each of the measurements of bottomhole pressure across the given interval of time comprising applying of the following first order equation ($FOD_i$) to the each of the measurements of bottomhole pressure across the given interval of time to generate a FOD value for each of the measurements of bottomhole pressure across the given interval of time:

$$FOD_i = \left(\frac{\partial p}{\partial T}\right)_i = \frac{\left(\frac{\Delta p_1}{\Delta T_1}\right)\Delta T_2 + \left(\frac{\Delta p_2}{\Delta T_2}\right)\Delta T_1}{\Delta T_1 + \Delta T_2}$$

wherein:

$\Delta p_1$ is a difference between a pressure associated with the measurement (i) and a pressure associated with the preceding measurement (i−1), $\Delta T_1$ is a difference between a superposition time associated with the measurement (i) and a superposition time associated with a preceding measurement (i−1), $\Delta p_2$ is a difference between the pressure associated with the measurement (i) and a pressure associated with a subsequent measurement (i+1), and $\Delta T_2$ is a difference between the superposition time associated with the measurement (i) and a superposition time associated with the subsequent measurement (i+1);

determining, based on the FOD values for the measurements of bottomhole pressure across the given interval of time, second order derivative (SOD) values for the measurements of bottomhole pressure across the given interval of time, the determining of the SOD values for the measurements of bottomhole pressure across the given interval of time comprising applying of the following second order equation ($SOD_i$) to each of the FOD values for the measurements of bottomhole pressure across the given interval of time to generate a SOD value for each of the measurements of bottomhole pressure across the given interval of time:

$$SOD_i = \left(\frac{\partial FOD}{\partial T}\right)_i - FOD_i$$

wherein, $$\left(\frac{\partial FOD}{\partial T}\right)_i = \frac{\left(\frac{\Delta FOD_1}{\Delta T_1}\right)\Delta T_2 + \left(\frac{\Delta FOD_2}{\Delta T_2}\right)\Delta T_1}{\Delta T_1 + \Delta T_2}$$

and wherein, $\Delta FOD_1$ is a difference between a FOD associated with the measurement (i) and a FOD associated with a preceding measurement (i−1), $\Delta T_1$ is a difference between a superposition time associated with the measurement (i) and a superposition time associated with a preceding measurement (i−1), $\Delta FOD_2$ is a difference between the FOD associated with the measurement (i) and a FOD associated with a subsequent measurement (i+1), and $\Delta T_2$ is a difference between the superposition time associated with the measurement (i) and a superposition time associated with the subsequent measurement (i+1); and generating a semi-log or log-log plot of the SOD values for the measurements of bottomhole pressure across the given interval of time.

14. The system of claim 13, the operations further comprising conducting the pressure transient testing of the hydrocarbon well.

15. The system of claim 14, wherein the pressure transient testing of the hydrocarbon well comprises conducing a build-up test of the hydrocarbon well that comprises conducting a shut-in of the hydrocarbon well to inhibit production flow from the wellbore of the hydrocarbon well.

16. The system of claim 14, wherein the pressure transient testing of the hydrocarbon well comprises conducing a draw-down test of the hydrocarbon well that comprises opening the hydrocarbon well to increase production flow from the wellbore of the hydrocarbon well.

17. The system of claim 13, the operations further comprising determining, based on the SOD values for the measurements of bottomhole pressure across the given interval of time, a reservoir characteristic for the hydrocarbon reservoir.

18. The system of claim 17, wherein the reservoir characteristic for the hydrocarbon reservoir comprises a permeability of the hydrocarbon reservoir.

19. The system of claim 17, the operations further comprising:
   determining, based on the reservoir characteristic for the hydrocarbon reservoir, operating parameters for a well in the hydrocarbon reservoir; and
   operating the well in accordance with the operating parameters.

20. The system of claim 17, wherein the operating parameters for a well in the hydrocarbon reservoir comprise an operating well flowrate or operating well pressure.

21. A non-transitory computer readable storage medium comprising program instructions stored thereon that are executable by a processor to perform the following operations for developing a hydrocarbon reservoir:
   obtaining, by way of a downhole pressure sensor disposed in the wellbore of the hydrocarbon well, pressure transient test data that comprises a number (n) of the prior changes in flowrates in the history corresponding to measurements of bottomhole pressure across a given interval of time during pressure transient testing of the hydrocarbon well;
   conducting, for the pressure data points, a time function superposition that comprises application of a superposition time function to generate superposition times for the measurements of bottomhole pressure across the given interval of time, the application of the superposition time function comprising applying the following superposition time function $T(\Delta t)$ to each of the pressure data points to generate a superposition time $(T_i)$ for each of the measurements of bottomhole pressure across the given interval of time:

$$T(\Delta t) = \frac{\sum_{l=1}^{n-1}(q_l - q_{l-1})\ln\left(\sum_{j=l}^{n-1}\Delta t_j + \Delta t\right)}{q_n - q_{n-1}} + \ln(\Delta t)$$

wherein:
   $\Delta t$ is an elapsed time since a last flowrate change of the hydrocarbon well to a current time,
   n is a number of changes in flowrate of the hydrocarbon well since the hydrocarbon well has been subject to its first production or injection to the current time of the elapsed time, $\Delta t$,
   $q_l$ is the $l^{th}$ rate of production of the hydrocarbon well at respective points in time sequence in standard conditions from the wellbore of the hydrocarbon well, including the rate of production at current time defined by the elapsed time, $\Delta t$, and
   $q_n$ is the $n^{th}$ rate of production of the hydrocarbon well;
   determining, based on the superposition times and corresponding measurements of bottomhole pressure across the given interval of time, first order derivative (FOD) values for the measurements of bottomhole pressure across the given interval of time, the determining of the FOD value for each of the measurements of bottomhole pressure across the given interval of time comprising applying of the following first order equation $(FOD_i)$ to the each of the measurements of bottomhole pressure across the given interval of time to generate a FOD value for each of the measurements of bottomhole pressure across the given interval of time:

$$FOD_i = \left(\frac{\partial p}{\partial T}\right)_i = \frac{\left(\frac{\Delta p_1}{\Delta T_1}\right)\Delta T_2 + \left(\frac{\Delta p_2}{\Delta T_2}\right)\Delta T_1}{\Delta T_1 + \Delta T_2}$$

wherein:
   $\Delta p_1$ is a difference between a pressure associated with the measurement (i) and a pressure associated with the preceding measurement (i−1),
   $\Delta T_1$ is a difference between a superposition time associated with the measurement (i) and a superposition time associated with a preceding measurement (i−1),
   $\Delta p_2$ is a difference between the pressure associated with the measurement (i) and a pressure associated with a subsequent measurement (i+1), and
   $\Delta T_2$ is a difference between the superposition time associated with the measurement (i) and a superposition time associated with the subsequent measurement (i+1);
   determining, based on the FOD values for the measurements of bottomhole pressure across the given interval of time, second order derivative (SOD) values for the measurements of bottomhole pressure across the given interval of time, the determining of the SOD values for the measurements of bottomhole pressure across the given interval of time comprising applying of the following second order equation $(SOD_i)$ to each of the FOD values for the measurements of bottomhole pressure across the given interval of time to generate a SOD value for each of the measurements of bottomhole pressure across the given interval of time:

$$SOD_i = \left(\frac{\partial FOD}{\partial T}\right)_i - FOD_i$$

wherein, $$\left(\frac{\partial FOD}{\partial T}\right)_i = \frac{\left(\frac{\Delta FOD_1}{\Delta T_1}\right)\Delta T_2 + \left(\frac{\Delta FOD_2}{\Delta T_2}\right)\Delta T_1}{\Delta T_1 + \Delta T_2}$$

and wherein,
   $\Delta FOD_1$ is a difference between a FOD associated with the measurement (i) and a FOD associated with a preceding measurement (i−1),
   $\Delta T_1$ is a difference between a superposition time associated with the measurement (i) and a superposition time associated with a preceding measurement (i−1),
   $\Delta FOD_2$ is a difference between the FOD associated with the measurement (i) and a FOD associated with a subsequent measurement (i+1), and
   $\Delta T_2$ is a difference between the superposition time associated with the measurement (i) and a superposition time associated with the subsequent measurement (i+1); and
   generating a semi-log or log-log plot of the SOD values for the measurements of bottomhole pressure across the given interval of time.

22. The medium of claim 21, the operations further comprising conducting the pressure transient testing of the hydrocarbon well.

23. The medium of claim 22, wherein the pressure transient testing of the hydrocarbon well comprises conducing a build-up test of the hydrocarbon well that comprises conducting a shut-in of the hydrocarbon well to inhibit production flow from the wellbore of the hydrocarbon well.

24. The medium of claim 22, wherein the pressure transient testing of the hydrocarbon well comprises conducing a draw-down test of the hydrocarbon well that comprises opening the hydrocarbon well to increase production flow from the wellbore of the hydrocarbon well.

25. The medium of claim 21, the operations further comprising determining, based on the SOD values for the measurements of bottomhole pressure across the given interval of time, a reservoir characteristic for the hydrocarbon reservoir.

26. The medium of claim 25, wherein the reservoir characteristic for the hydrocarbon reservoir comprises a permeability of the hydrocarbon reservoir.

27. The medium of claim 25, the operations further comprising:
   determining, based on the reservoir characteristic for the hydrocarbon reservoir, operating parameters for a well in the hydrocarbon reservoir; and
   operating the well in accordance with the operating parameters.

28. The medium of claim 25, wherein the operating parameters for a well in the hydrocarbon reservoir comprise an operating well flowrate or operating well pressure.

* * * * *